(12) United States Patent
Lu et al.

(10) Patent No.: US 12,451,117 B2
(45) Date of Patent: Oct. 21, 2025

(54) INFORMATION PROCESSING METHOD, TERMINAL DEVICE, AND DISTRIBUTED NETWORK

(71) Applicant: HUAWEI TECHNOLOGIES CO., LTD., Guangdong (CN)

(72) Inventors: Bo Lu, Hangzhou (CN); Dexiang Jia, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 273 days.

(21) Appl. No.: 18/308,466

(22) Filed: Apr. 27, 2023

(65) Prior Publication Data

US 2023/0267915 A1   Aug. 24, 2023

Related U.S. Application Data

(63) Continuation of application No. PCT/CN2021/114034, filed on Aug. 23, 2021.

(30) Foreign Application Priority Data

Oct. 28, 2020   (CN) .......................... 202011173845.2

(51) Int. Cl.
*G10L 13/00*   (2006.01)
*G06F 3/14*   (2006.01)
(Continued)

(52) U.S. Cl.
CPC ................ *G10L 13/08* (2013.01); *G06F 3/14* (2013.01); *G10L 13/04* (2013.01)

(58) Field of Classification Search
CPC .... G06F 17/211; G06F 17/3089; G06F 3/167; G06F 3/0483; G06F 3/14; G10L 13/00; G10L 15/00; G10L 13/08; G10L 13/04
See application file for complete search history.

(56) References Cited

U.S. PATENT DOCUMENTS

| 6,033,224 | A | * | 3/2000 | Kurzweil | ............ | G09B 21/006 |
| | | | | | | 434/178 |
| 6,052,663 | A | * | 4/2000 | Kurzweil | ............ | G06F 3/04842 |
| | | | | | | 704/260 |

(Continued)

FOREIGN PATENT DOCUMENTS

| CN | 106844679 A | 6/2017 |
| CN | 108230428 A | 6/2018 |

(Continued)

OTHER PUBLICATIONS

International Search Report and Written Opinion in International Appln. No. PCT/CN2021/114034, mailed on Nov. 19, 2021, 19 pages (with English translation).

(Continued)

*Primary Examiner* — Jakieda R Jackson
(74) *Attorney, Agent, or Firm* — Fish & Richardson P.C.

(57) ABSTRACT

This application provides information processing methods, terminal devices, and distributed networks. In an implementation, after determining target information including at least one piece of text information and at least one piece of non-text information, a terminal device may determine, based on a predetermined playing speed and a predetermined time, at least one first location associated with at least one piece of non-text information. Text-to-speech is sequentially performed on the at least one piece of text information, to obtain and sequentially play speech information respectively corresponding to the at least one piece of text information. In response to speech information corresponding to first text information being played, target non-text information is sent to a second terminal device, so that the second terminal device displays the target non-text information.

18 Claims, 13 Drawing Sheets

(51) Int. Cl.
*G10L 13/04* (2013.01)
*G10L 13/08* (2013.01)

(56) References Cited

U.S. PATENT DOCUMENTS

| | | | | |
|---|---|---|---|---|
| 6,199,042 | B1* | 3/2001 | Kurzweil | G09B 17/006 |
| | | | | 704/278 |
| 9,471,275 | B1* | 10/2016 | Abou Mahmoud | G06F 3/165 |
| 9,558,733 | B1* | 1/2017 | Korn | G06F 3/167 |
| 9,865,250 | B1* | 1/2018 | Korn | G10L 13/08 |
| 2006/0280338 | A1* | 12/2006 | Rabb | G09B 21/006 |
| | | | | 704/271 |
| 2007/0009161 | A1* | 1/2007 | Hollingsworth | G06V 30/40 |
| | | | | 382/229 |
| 2007/0130563 | A1* | 6/2007 | Elgazzar | G06F 40/58 |
| | | | | 717/137 |
| 2007/0198353 | A1* | 8/2007 | Behringer | G06Q 30/0277 |
| | | | | 705/14.55 |
| 2008/0162474 | A1* | 7/2008 | Thong | G06F 16/93 |
| 2009/0006078 | A1* | 1/2009 | Selegey | G06F 40/268 |
| | | | | 704/9 |
| 2009/0182549 | A1* | 7/2009 | Anisimovich | G06F 40/30 |
| | | | | 704/4 |
| 2010/0070448 | A1* | 3/2010 | Omoigui | H10F 39/1825 |
| | | | | 706/55 |
| 2010/0095210 | A1* | 4/2010 | Bradley | G06Q 50/01 |
| | | | | 709/246 |
| 2010/0106506 | A1 | 4/2010 | Carter et al. | |
| 2010/0315359 | A1* | 12/2010 | Seong | G09G 3/36 |
| | | | | 345/173 |
| 2013/0191108 | A1* | 7/2013 | Anisimovich | G06F 40/30 |
| | | | | 704/4 |
| 2014/0195471 | A1* | 7/2014 | Chen | G06N 99/00 |
| | | | | 706/46 |
| 2014/0331125 | A1* | 11/2014 | Tigchelaar | G06F 40/103 |
| | | | | 715/249 |
| 2014/0344206 | A1* | 11/2014 | Deng | G06N 5/04 |
| | | | | 706/47 |
| 2015/0067485 | A1* | 3/2015 | Kim | G06F 3/0488 |
| | | | | 715/256 |
| 2016/0210602 | A1* | 7/2016 | Siddique | G16H 10/60 |
| 2016/0266654 | A1* | 9/2016 | Lehtiniemi | G06F 3/0484 |
| 2017/0034006 | A1* | 2/2017 | Rajapakse | H04L 45/121 |
| 2017/0185836 | A1* | 6/2017 | Okumura | G06F 18/22 |
| 2018/0082602 | A1* | 3/2018 | Schlender | G06F 16/435 |
| 2018/0101504 | A1* | 4/2018 | DiTomaso | G10L 13/00 |
| 2019/0005959 | A1* | 1/2019 | Cameron | G10L 21/055 |
| 2020/0034492 | A1* | 1/2020 | Verbeke | G06F 16/636 |
| 2020/0035218 | A1* | 1/2020 | Davies | G06F 3/167 |
| 2020/0293266 | A1* | 9/2020 | German | G10L 13/08 |

FOREIGN PATENT DOCUMENTS

| | | |
|---|---|---|
| CN | 109448709 A | 3/2019 |
| CN | 107657973 B | 5/2020 |
| KR | 20190021407 A | 3/2019 |

OTHER PUBLICATIONS

Extended European Search Report in European Appln. No. 21884607.9, mailed on Dec. 11, 2023, 7 pages.

* cited by examiner

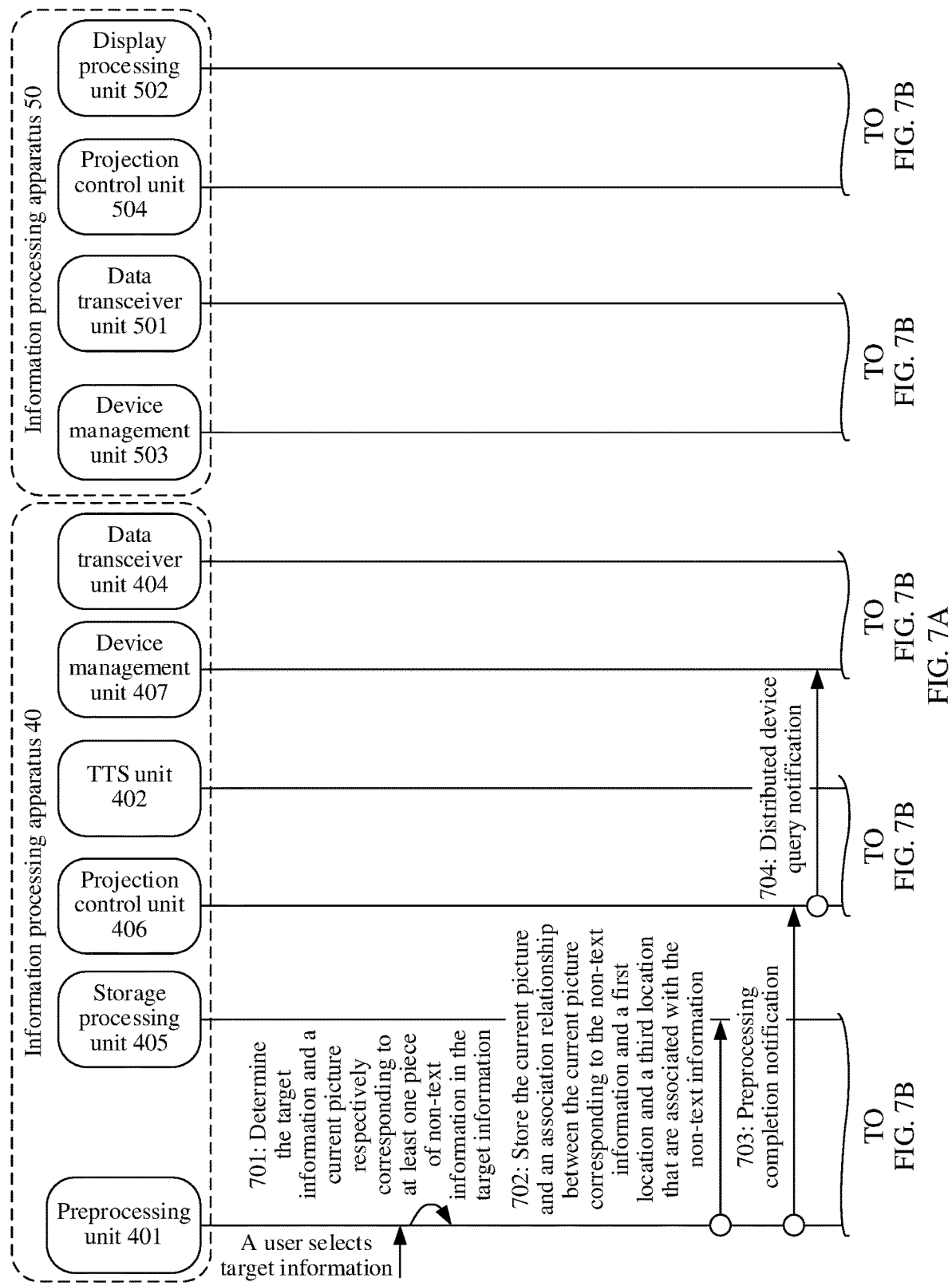

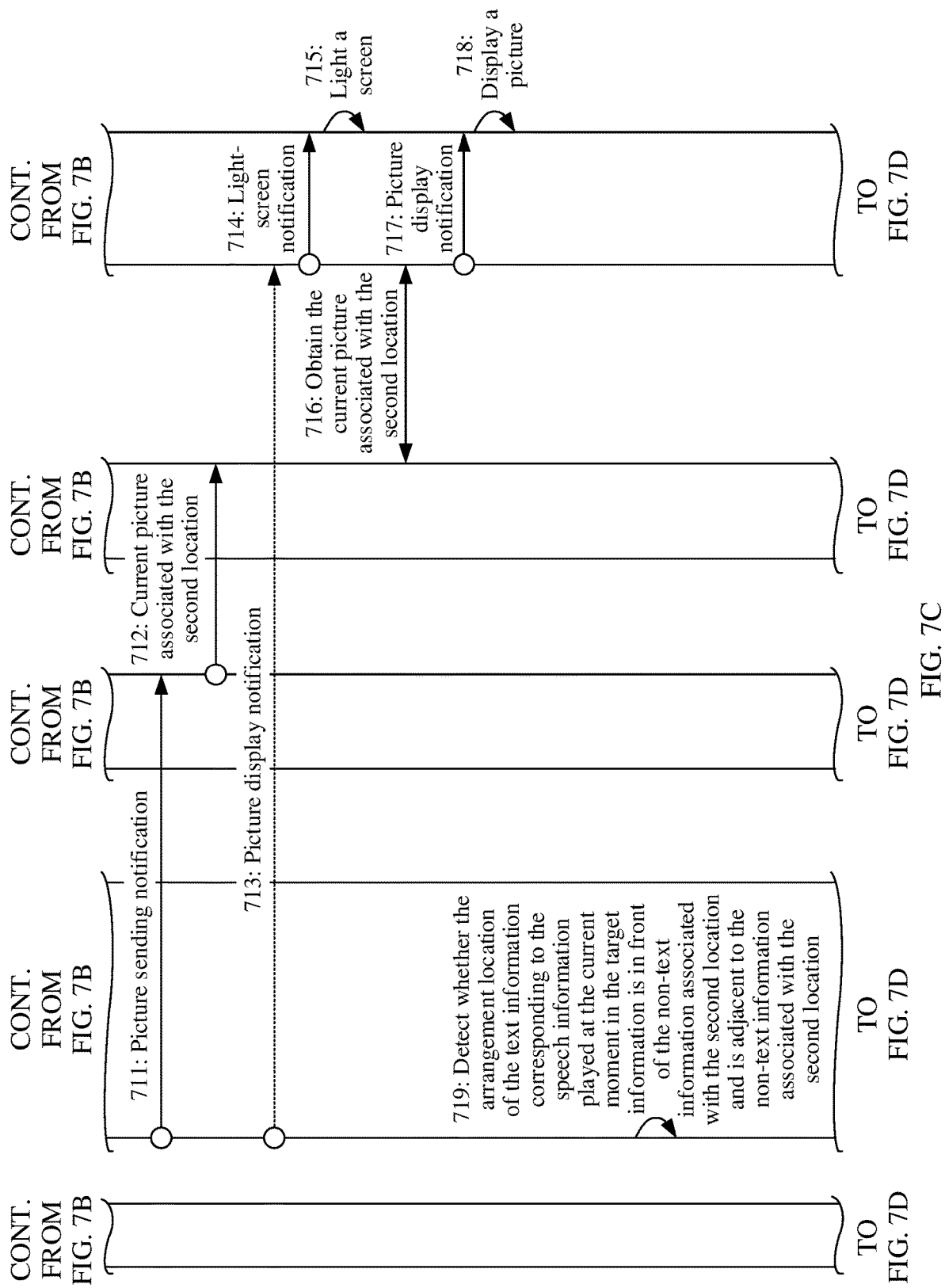

INFORMATION PROCESSING METHOD, TERMINAL DEVICE, AND DISTRIBUTED NETWORK

CROSS-REFERENCE TO RELATED APPLICATIONS

This application is a continuation of International Application No. PCT/CN2021/114034, filed on Aug. 23, 2021, which claims priority to Chinese Patent Application No. 202011173845.2, filed on Oct. 28, 2020. The disclosures of the aforementioned applications are hereby incorporated by reference in their entireties.

TECHNICAL FIELD

This application relates to the field of computer technologies, and in particular, to an information processing method, a terminal device, and a distributed network.

BACKGROUND

With development of intelligent terminals and popularization of hardware products such as true wireless stereo (true wireless stereo, TWS) wireless headsets, story players, and smart speakers, audio reading, as a manner of obtaining information, is gradually applied to more scenarios and is used more frequently. For example, in various service scenarios such as driving, walking, taking a bus, waiting in a queue, and doing housework, a user can obtain information through audio reading. This greatly improves time utilization.

Generally, the audio reading means that for target information including text information, for example, an e-book, a web page, and a document in a specific format, the text information included in the target information is converted into corresponding speech information, and the speech information is played by a corresponding terminal device, so that the user can learn of content of the target information from the speech information.

However, the target information usually further includes non-text information that cannot be converted into speech information, for example, various types of information such as a picture, a formula, reference and annotation, a personal name, and a place name. When learning of context content of a piece of non-text information from the speech information played by the terminal device, the user usually needs to perform an operation on the terminal device, for example, unlock a display of the terminal device, open an application, and perform a corresponding operation in a graphical user interface of the application to view the piece of non-text information. This results in poor user experience.

SUMMARY

Embodiments of this application provide an information processing method, a terminal device, and a distributed network, so that user experience is good.

Embodiments of this application provide at least the following technical solutions.

According to a first aspect, an information processing method is provided, and is applied to a first terminal device. The first terminal device first determines target information that needs to be processed, where the target information includes at least one piece of text information and at least one piece of non-text information. Next, a first location respectively associated with the at least one piece of non-text information is determined based on a preset playing speed and a first preset time. Next, text-to-speech (text-to-speech, TTS) is sequentially performed on the at least one piece of text information based on a respective arrangement location of the at least one piece of text information in the target information, to obtain speech information respectively corresponding to the at least one piece of text information, and the speech information respectively corresponding to the at least one piece of text information is sequentially played. If a second terminal device configured to display the at least one piece of non-text information exists, when playing speech information corresponding to first text information, the first terminal device sends target non-text information to the second terminal device, so that the second terminal device displays the target non-text information. The at least one piece of text information includes the first text information. An arrangement location of the first text information in the target information includes a second location. The second location is a first location associated with any piece of non-text information. The target non-text information is non-text information associated with the second location.

In other words, for any piece of non-text information included in the target information, when the first terminal device plays speech information corresponding to text information that is at a specific location in front of the piece of non-text information, if a second terminal device configured to display non-text information exists, the piece of non-text information is sent by the first terminal device to the second terminal device configured to display non-text information, and the second terminal device displays the piece of non-text information. In this way, when a user learns of context content of a piece of non-text information from the speech information played by the first terminal device, the user may view the piece of non-text information on the second terminal device. In this process, the user does not need to perform frequent operations on the first terminal device that performs audio reading, so that user experience is good.

In addition, after determining the target information, the first terminal device sequentially performs TTS on the at least one piece of text information included in the target information, to obtain and sequentially play the speech information respectively corresponding to the at least one piece of text information, and it is not necessary to manually record sound or convert text information into speech information in another manner.

In a possible implementation, a pre-trained natural language processing model is deployed in the first terminal device, and TTS is sequentially performed, through the natural speech processing model, on the at least one piece of text information included in the target information. Correspondingly, the first terminal device may send the target non-text information to the second terminal device when the first terminal device performs TTS on the first text information.

In a possible implementation, the first terminal device may further determine, based on the preset playing speed and a second preset time, a third location respectively associated with the at least one piece of non-text information. The first terminal device sends indication information to the second terminal device when playing speech information corresponding to second text information, where the at least one piece of text information includes the second text information, an arrangement location of the second text information in the target information includes a fourth location, the fourth location is a third location associated with the target non-text information, and the indication information indicates the second terminal device to stop displaying the target non-text information.

In a possible implementation, when accumulated duration after the first terminal device sends the target non-text information to the second terminal device reaches predetermined duration, indication information may further be sent to the second terminal device, where the indication information indicates the second terminal device to stop displaying the target non-text information.

In this way, for any piece of non-text information in the target information, after the user learns of context content of the piece of non-text information from the speech information played by the first terminal device, the second terminal device no longer displays the piece of non-text information. This avoids a waste of a screen resource of the second terminal device.

In a possible implementation, the first terminal device may further play first speech information after speech information corresponding to third text information is played, where the first speech information indicates that the target non-text information is displayed on the second terminal device, an arrangement location of the third text information in the target information is in front of an arrangement location of the target non-text information in the target information, and is adjacent to the arrangement location of the target non-text information in the target information, and the at least one piece of text information includes the third text information. In this way, the user does not need to actively search for the second terminal device configured to display non-text information. This further improves user experience.

In a possible implementation, the first terminal device may further send a capability query message to the second terminal device. Correspondingly, the first terminal device may further receive a capability response message from the second device, where the capability response message indicates whether the second terminal device can be configured to display the at least one piece of non-text information. In this way, the first terminal device can send non-text information to the second terminal device according to a corresponding policy in a subsequent process only when one second terminal device can be configured to display at least one piece of non-text information.

In a possible implementation, before sending the capability query message to the second terminal device, the first terminal device may further determine scenario configuration information of the first terminal device; then determine a priority sequence of at least two third terminal devices based on the scenario configuration information, where the at least two third terminal devices and the first terminal device are located in a same distributed network; and then select the second terminal device from the at least two third terminal devices according to the priority sequence.

In other words, when the distributed network to which the first terminal device belongs includes a plurality of third terminal devices, the second terminal device that can be configured to display non-text information and that facilitates viewing of non-text information may be determined from the at least two third terminal devices based on the scenario configuration information. This further improves user experience.

In a possible implementation, if no second terminal device configured to display the at least one piece of non-text information exists, when the speech information corresponding to the first text information is played, the first terminal device may further display the target non-text information. In other words, if no second terminal device that can be configured to display non-text information exists, when the user learns of context content of a piece of non-text information from the speech information played by the first terminal device, the user may view the piece of non-text information on the first terminal device.

In a possible implementation, if no second terminal device that can be configured to display non-text information exists, and the display of the first terminal device is in an off state, the first terminal device may automatically light the display of the first terminal device. After the display of the first terminal device is lit, the display usually displays a lock screen of the display. In this case, the first terminal device may directly display the target non-text information on the lock screen without unlocking the display of the first terminal device. In this way, after the first terminal device stops displaying the target non-text information, the display of the first terminal device restores displaying of the lock screen of the first terminal device, to avoid another problem caused by accidental touch of the display.

In a possible implementation, a type of any piece of non-text information may include, but not limited to, any one or more of the following types: a picture, a chart, a formula, computer program code, and a special symbol.

In a possible implementation, the first terminal device may further determine a current picture respectively corresponding to the at least one piece of non-text information. Correspondingly, when the first terminal device plays the speech information corresponding to the first text information, the first terminal device may no longer send the target non-text information to the second terminal device, but instead send, to the second terminal device, a current picture corresponding to the target non-text information. In other words, for any piece of non-text information of a type other than a picture, a corresponding current picture may be generated for the piece of non-text information, where the current picture includes an image of the non-text information, so that the user can learn of the corresponding non-text information from the current picture displayed on the second terminal device.

According to a second aspect, an information processing method is provided, and is applied to a second terminal device. For beneficial effects of the method, refer to the descriptions in the first aspect. The second terminal device may receive target non-text information from the first terminal device, and display the target non-text information.

In a possible implementation, the second terminal device may further receive indication information from the first terminal device, and stop displaying of the target non-text information based on an indication of the indication information.

In a possible implementation, the second terminal device may further receive a capability query message from the first terminal device. Next, in response to the capability query message, it is queried whether the capability query message can be used to display non-text information. Next, a capability response message is sent to the first terminal device, where the capability response message indicates whether the second terminal device can be configured to display non-text information.

According to a third aspect, an information processing apparatus is provided. The apparatus includes units or means configured to implement the steps performed by the first terminal device in the first aspect. For beneficial effects of the apparatus, refer to the descriptions in the first aspect.

According to a fourth aspect, an information processing method is provided. The apparatus includes units or means configured to implement the steps performed by the second terminal device in the second aspect. For beneficial effects of the apparatus, refer to the descriptions in the first aspect.

According to a fifth aspect, a first terminal device is provided. For beneficial effects of the first terminal device, refer to the description in the first aspect. The first terminal device includes a memory, a communications interface, an audio module, and a processor, where the memory is configured to store computer instructions; and the processor is configured to execute the computer instructions to implement: determining target information, where the target information includes at least one piece of text information and at least one piece of non-text information; determining, based on a preset playing speed and a first preset time, a first location respectively associated with the at least one piece of non-text information; sequentially performing text-to-speech TTS on the at least one piece of text information, to obtain speech information respectively corresponding to the at least one piece of text information, and sequentially playing the speech information respectively corresponding to the at least one piece of text information with the audio module; and if a second terminal device configured to display the at least one piece of non-text information exists, when speech information corresponding to first text information is played with the audio module, sending target non-text information to the second terminal device through the communications interface, where the at least one piece of text information includes the first text information, an arrangement location of the first text information in the target information includes a second location, the second location is a first location associated with any piece of non-text information, and the target non-text information is non-text information associated with the second location.

In a possible implementation, the processor is further configured to implement: determining, based on the preset playing speed and a second preset time, a third location respectively associated with the at least one piece of non-text information; and sending indication information to the second terminal device through the communications interface when speech information corresponding to second text information is played with the audio module, where the at least one piece of text information includes the second text information, an arrangement location of the second text information in the target information includes a fourth location, the fourth location is a second location associated with the target non-text information, and the indication information indicates the second terminal device to stop displaying the target non-text information.

In a possible implementation, the processor is further configured to implement: when accumulated duration after the target non-text information is sent to the second terminal device reaches predetermined duration, sending indication information to the second terminal device, where the indication information indicates the second terminal device to stop displaying the target non-text information.

In a possible implementation, the processor is further configured to implement: playing first speech information with the audio module after speech information corresponding to third text information is played with the audio module, where the first speech information indicates that the target non-text information is displayed on the second terminal device, an arrangement location of the third text information in the target information is in front of an arrangement location of the target non-text information in the target information, and is adjacent to the arrangement location of the target non-text information in the target information, and the at least one piece of text information includes the third text information.

In a possible implementation, the processor is further configured to implement: sending a capability query message to the second terminal device through the communications interface; and receiving a capability response message from the second device through the communications interface, where the capability response message indicates whether the second terminal device can be configured to display non-text information.

In a possible implementation, the processor is further configured to implement: determining scenario configuration information of the first terminal device; determining a priority sequence of at least two third terminal devices based on the scenario configuration information, where the at least two third terminal devices and the first terminal device are located in a same distributed network; and selecting the second terminal device from the at least two third terminal devices according to the priority sequence.

In a possible implementation, the first terminal device further includes a display. The processor is further configured to implement: if no second terminal device configured to display the at least one piece of non-text information exists, when the speech information corresponding to the first text information is played with the audio module, displaying the target non-text information on the display.

In a possible implementation, the processor is further configured to implement: lighting the display, where the target non-text information is displayed on a lock screen of the display.

In a possible implementation, a type of any piece of non-text information includes any one of the following types: a picture, a chart, a formula, computer program code, and a special symbol.

In a possible implementation, the processor is further configured to implement: determining a current picture respectively corresponding to the at least one piece of non-text information. The processor may be specifically configured to implement: sending a current picture corresponding to the target non-text information to the second terminal device through the communications interface.

According to a sixth aspect, a second terminal device is provided. For beneficial effects of the first terminal device, refer to the description in the first aspect. The second terminal device includes a communications interface, a memory, a processor, and a display, where the memory is configured to store computer instructions; and the processor is configured to execute the computer instructions, to implement: receiving target non-text information from a first terminal device through the communications interface; and displaying the target non-text information on the display.

In a possible implementation, the processor is further configured to implement: receiving indication information from the first terminal device through the communications interface; and stopping displaying of the target non-text information based on an indication of the indication information.

In a possible implementation, the processor is further configured to implement: receiving a capability query message from the first terminal device through the communications interface; in response to the capability query message, querying whether the second terminal device can be configured to display non-text information; and sending a capability response message to the first terminal device through the communications interface, where the capability response message indicates whether the second terminal device can be configured to display non-text information.

According to a seventh aspect, a distributed network is provided. For beneficial effects of the distributed network, refer to the description in the first aspect. The distributed network includes the first terminal device according to the fifth aspect and the second terminal device according to the sixth aspect.

In a possible implementation, the distributed network includes at least two third terminal devices, and the second terminal device is a third terminal device that receives the capability query message.

According to an eighth aspect, a computer-readable storage medium is provided, and is configured to store computer instructions. When the computer instructions are executed by a processor of a terminal device, the terminal device is enabled to implement the method in the first aspect or the method in the second aspect.

According to a ninth aspect, a computer program product is provided. The computer program product includes computer program code/instructions. When the computer program code/instructions runs/run on a computer, the computer is enabled to perform the method according to the first aspect or the method according to the second aspect.

In the foregoing aspects, the processor may be implemented by hardware, or may be implemented by software. When the processor is implemented by the hardware, the processor may be a logic circuit, an integrated circuit, or the like. When the processor is implemented by software, the processor may be a general purpose processor, and is implemented by reading computer program code/instructions stored in a memory. The memory may be integrated in the processor, or may be located outside the processor and exist independently.

BRIEF DESCRIPTION OF DRAWINGS

The following briefly describes the accompanying drawings that need to be used in the descriptions of embodiments.

FIG. 7A to FIG. 7D are a schematic diagram of a process in which an information processing apparatus used in a first terminal device and an information processing apparatus used in a second terminal device process target information;

DESCRIPTION OF EMBODIMENTS

The following describes the technical solutions in embodiments of this application with reference to the accompanying drawings in embodiments of this application.

In embodiments of this application, the term "and/or" is merely used to describe an association relationship between associated objects and indicates that three relationships may exist. For example, "A and/or B" may indicate the following three cases: Only A exists, only B exists, and both A and B exist. The term "a plurality of" means two or more, and the term "several" means one or more, unless otherwise specified. The terms "include", "have", and their variants all mean "include but are not limited to", unless otherwise specifically emphasized in another manner. Terms "first" and "second" are used only for a purpose of description, and shall not be construed as indicating or implying relative importance or implying a quantity of indicated technical features. Therefore, a feature restricted by "first" or "second" may explicitly indicate or implicitly include one or more such features.

In embodiments of this application, the terms such as "example" or "for example" is used to represent giving an example, an illustration, or a description, and are intended to present a related concept in a specific manner. Any embodiment or design scheme described as an "example" or "for example" should not be explained as being more preferable or having more advantages than another embodiment or design scheme.

In embodiments of this application, a terminal device may also be represented as a mobile device (mobile device, MD), user equipment (user equipment, UE), or a mobile terminal (mobile terminal, MT). Specifically, the terminal device may include a mobile phone, a television, a wearable device, a tablet computer, a personal digital assistant (personal digital assistant, PDA), a laptop computer (laptop), a mobile computer, an augmented reality (augmented reality, AR) device, a virtual reality (virtual reality, VR) device, an artificial intelligence (artificial intelligence, AI) device, and the like.

Figure 1:
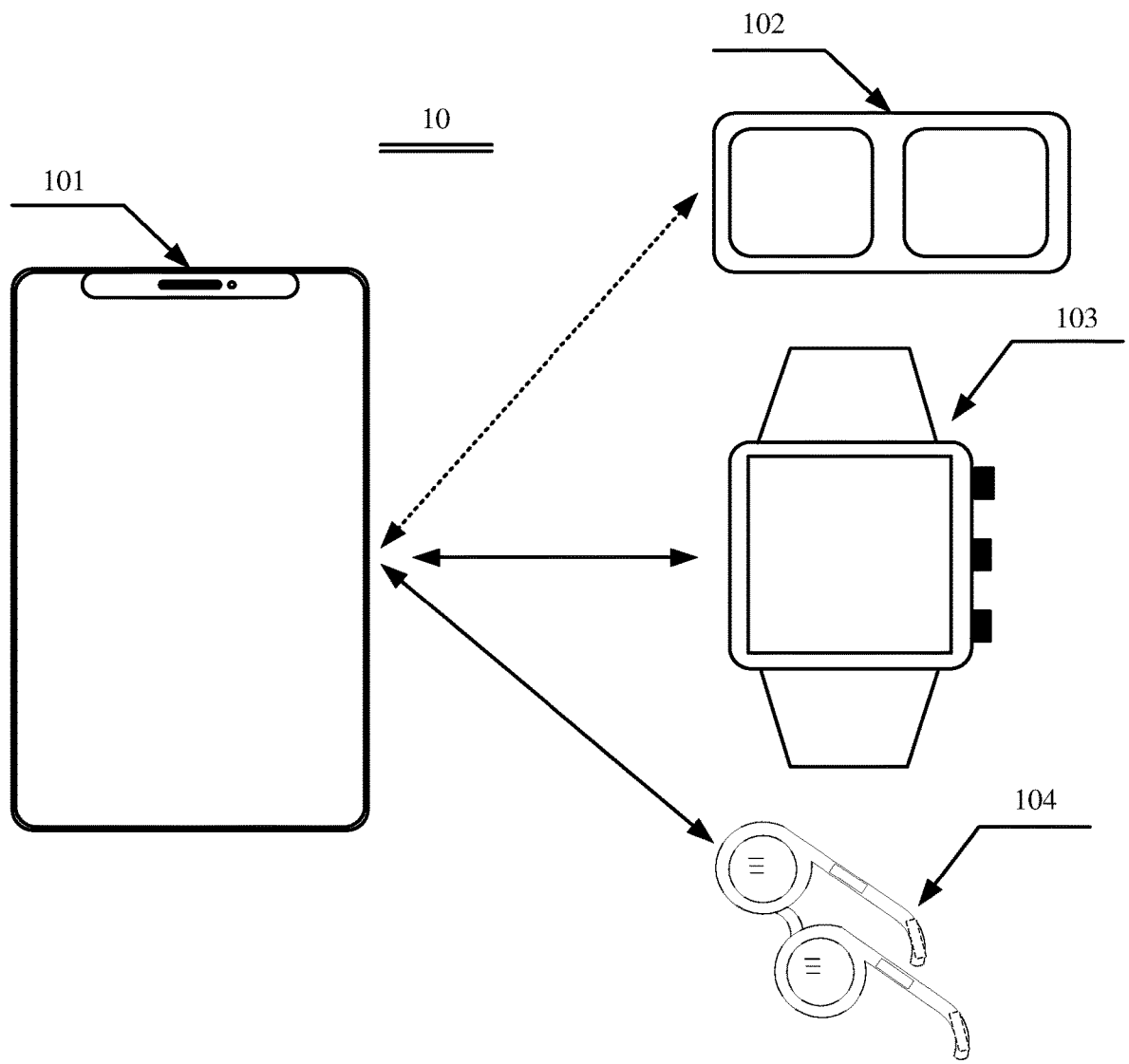
FIG. 1 is a schematic diagram of a system framework of a technical solution according to an embodiment of this application.

FIG. 1 is a schematic diagram of a system framework of a technical solution according to an embodiment of this application.

As shown in FIG. 1, the distributed network 10 may include a plurality of terminal devices, for example, a terminal device 101, a terminal device 102, a terminal device 103, and a terminal device 104. The distributed network 10 may be networked based on a service scenario.

For example, in a service scenario in which a user drives a vehicle, a mobile phone carried by the user may be used as the terminal device 101, an in-vehicle terminal deployed on the vehicle may be used as the terminal device 102, a smartwatch worn by the user may be used as the terminal device 103, and smart glasses worn by the user may be used as the terminal device 104, to form the distributed network 10.

For example, in a service scenario in which a user walks outdoors, a mobile phone carried by the user may be used as the terminal device 101, a smartwatch worn by the user may be used as the terminal device 103, and smart glasses worn by the user may be used as the terminal device 104, to form the distributed network 10.

For example, in a service scenario in which a user does housework, a mobile phone carried by the user may be used as the terminal device 101, a smart television at a home of the user may be used as the terminal device 102, a smartwatch worn by the user may be used as the terminal device 103, and smart glasses worn by the user may be used as the terminal device 104, to form the distributed network 10.

When a terminal device is used to perform audio reading on target information and context content (one or more pieces of text information) of a piece of non-text information included in the target information is learned of from speech information played by the terminal device, the user usually needs to perform a corresponding active operation on the terminal device to view the piece of non-text information. However, in some service scenarios, for example, a service scenario in which the user drives a vehicle, walks outdoors, or does housework, an execution body of performing the audio reading on the target information is usually a terminal device carried by the user. It is inconvenient for the user to perform a corresponding operation on the terminal device to view non-text information, and the user usually needs to frequently perform operations on the terminal device to view the corresponding non-text information. This results in poor user experience.

In view of this, embodiments of this application at least provide an information processing method, a terminal device, and a distributed network. When a first terminal device in a distributed network is used to perform audio reading on target information, for any piece of non-text information included in the target information, when the first terminal device plays speech information corresponding to text information that is at a specific location in front of the piece of non-text information, if a second terminal device configured to display non-text information exists in the distributed network, the piece of non-text information is sent by the first terminal device to the second terminal device configured to display non-text information, and the second terminal device displays the piece of non-text information. In this way, when a user learns of context content of a piece of non-text information from the speech information played by the first terminal device, the piece of non-text information may be viewed on the second terminal device. The user does not need to perform operations on the first terminal device that performs audio reading, so that user experience is good.

A process in which a first terminal device and a second terminal device process target information is used as an example for description below.

Figure 2A:
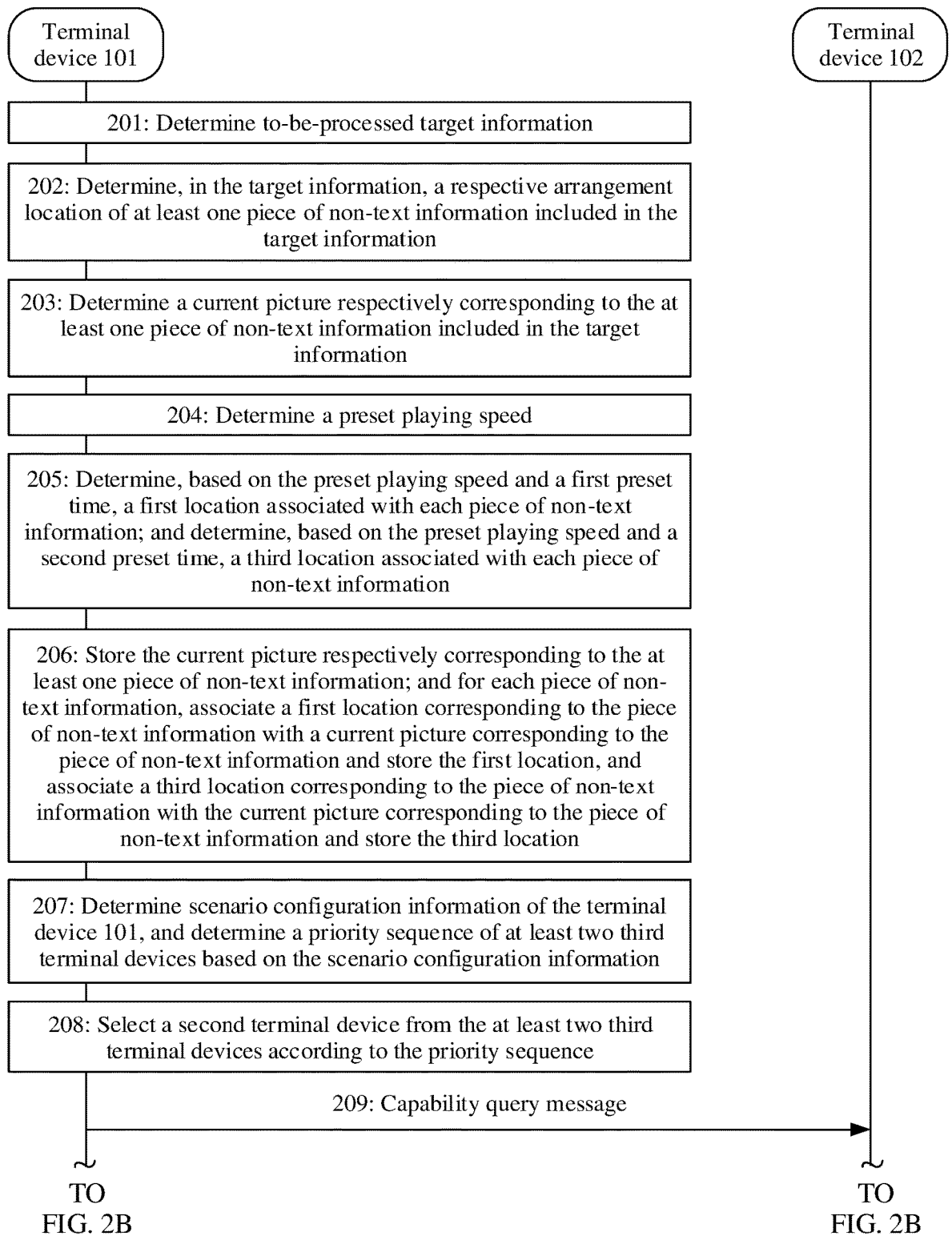
FIG. 2A and FIG. 2B are a schematic diagram 1 of a process in which a first terminal device and a second terminal device process target information.
Figure 2B:
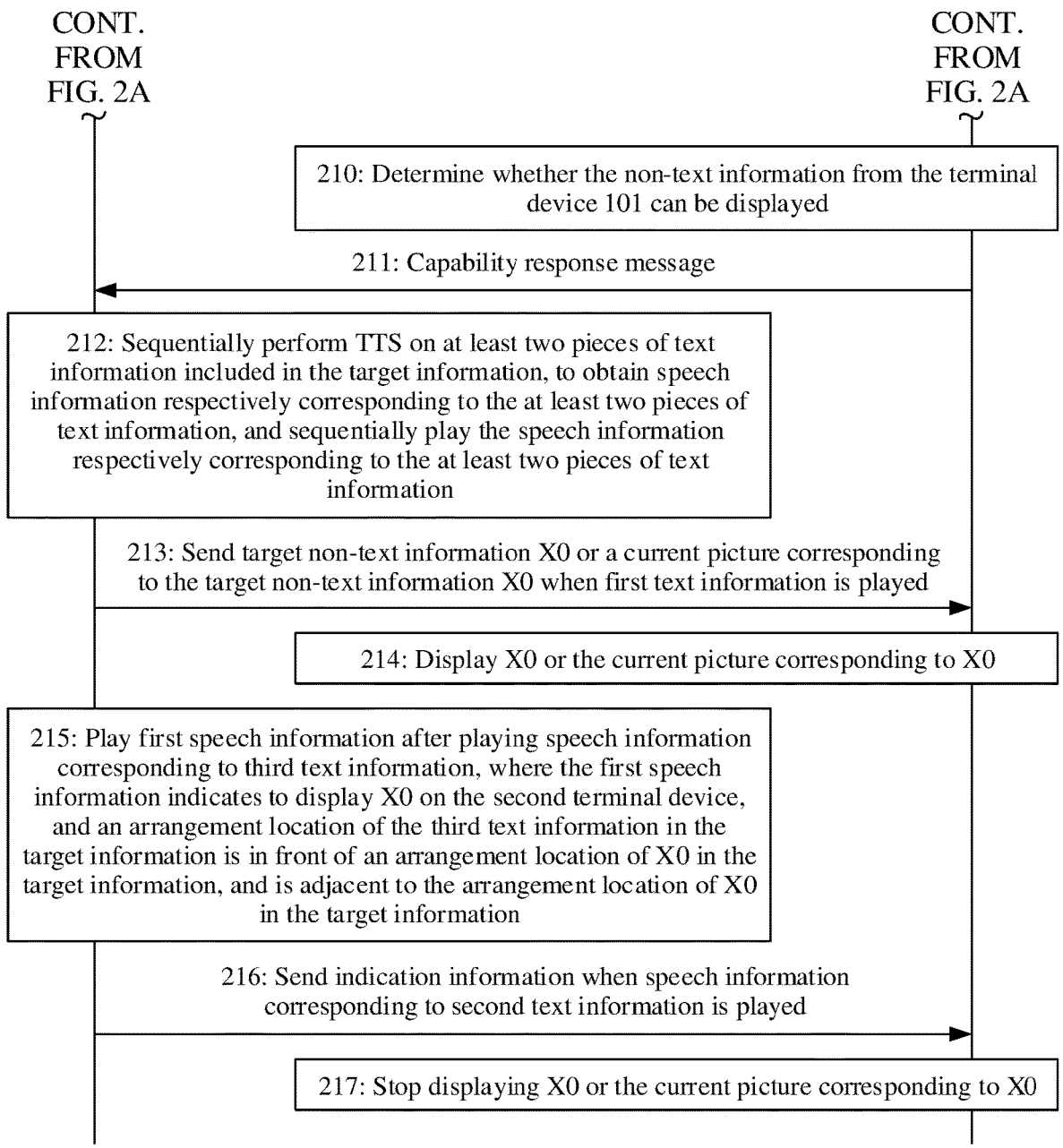

FIG. 2A and FIG. 2B are a schematic diagram of a process in which a first terminal device and a second terminal device process target information. The process may include some or all steps shown in FIG. 2A and FIG. 2B. For ease of description, a terminal device 101 is used as the first terminal device herein.

First, when a user performs audio reading on the target information through the terminal device 101, the terminal device 101 performs step 201 of determining to-be-processed target information.

The target information may include but is not limited to an e-book, a web page, and a document in a specific format.

Figure 3:
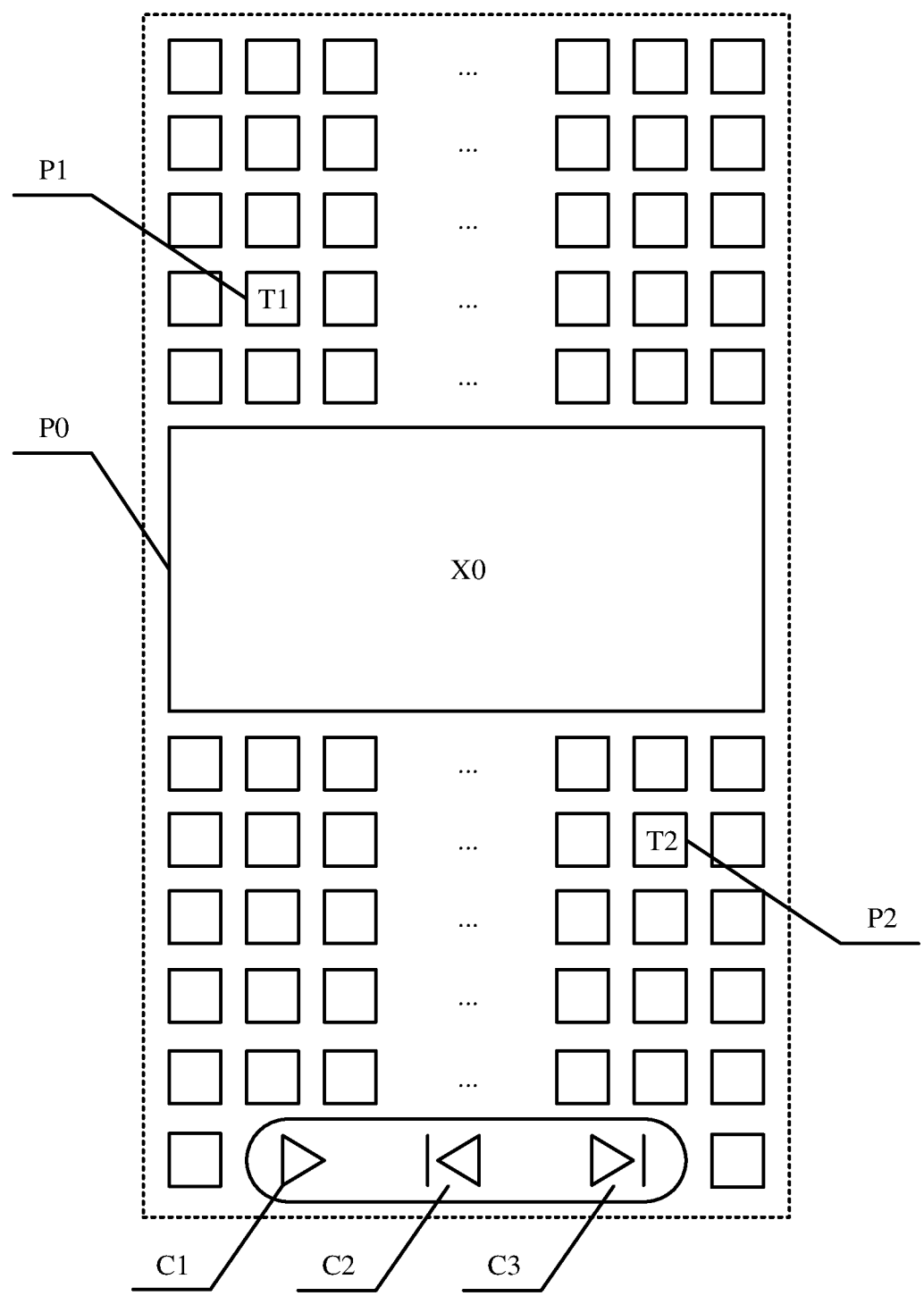
FIG. 3 is a schematic diagram of a graphical user interface displayed by a first terminal device.

Refer to FIG. 3. When the user opens a to-be-read e-book through an application in the terminal device 101, the terminal device 101 may present a part or all of content of the e-book to the user through a graphical user interface shown in FIG. 3. Correspondingly, the to-be-read e-book is also determined by the terminal device 101 as the to-be-processed target information.

Optionally, the terminal device 101 further performs step 202 of determining, in the target information, a respective arrangement location of at least one piece of non-text information included in the target information.

The target information includes at least one piece of text information and the at least one piece of non-text information, and the at least one piece of text information and the at least one piece of non-text information are sequentially arranged in a specific sequence. The text information refers to information formed by a common character (such as a Chinese character, an English word, and a punctuation mark). TTS may be performed on the text information, to obtain speech information that can express a meaning of the text information. The non-text information refers to other information that cannot be expressed through speech information such as a picture, a chart, a formula, reference and annotation, computer program code, and an uncommon personal name or place name. TTS usually cannot be performed on the non-text information, that is, the speech information that can express a meaning of the non-text information usually cannot be obtained.

For any piece of non-text information in the target information, if a total quantity of pieces of other non-text information arranged in front of the non-text information is M, and a quantity of characters included in all the text information arranged in front of the non-text information is O, an arrangement location of the non-text information in the target information may be represented as M+O+1.

Optionally, the terminal device 101 further performs step 203 of determining a current picture respectively corresponding to the at least one piece of non-text information included in the target information. For any piece of non-text information, if a type of the non-text information is a picture, a current picture corresponding to the non-text information is the non-text information. Alternatively, if a type of the non-text information is a type other than a picture, a current picture corresponding to the non-text information needs to include an image of the non-text information.

Optionally, the terminal device 101 further performs step 204 of determining a preset playing speed.

A dimension of the preset playing speed may include but is not limited to "character/second".

For example, the terminal device 101 may display the graphical user interface shown in FIG. 3. The graphical user interface includes a start/stop control icon C1, a slow-down control icon C2, and a speed-up control icon C3. The user may start or stop, with the start/stop control icon C1, a process in which the first terminal device and the second terminal device process the target information. The user may adjust the preset playing speed based on a preset initial playing speed by triggering the slow-down control icon C2 and the speed-up control icon C3.

The terminal device 101 performs step 205 of determining, based on the preset playing speed and a first preset time, a first location respectively associated with the at least one piece of non-text information; and determining, based on the preset playing speed and a second preset time, a third location respectively associated with the at least one piece of non-text information.

Refer to FIG. 3. The preset playing speed is V character/second, and the first preset time is t1 seconds. For non-text information X0 at an arrangement location P0 and a character T1 at a first location P1 associated with X0, a quantity of characters between X0 and P1 may be V*t1 or (V*t1−1). In step 205, it may be determined that an arrangement location P1 of a $(V \ast t1)^{th}$ or $(V \ast t1+1)^{th}$ character T1 located in front of X0 in the target information is the first location associated with X0.

When the terminal device 101 performs step 202, the preset playing speed is V character/second, and the first preset time is t1 seconds. The first location P1 associated with X0 may be obtained by subtracting V*t1 or V*t1+1 from the arrangement location P0 of X0.

Based on a method similar to the foregoing method for determining the first location respectively associated with each piece of non-text information, a third location respectively associated with each piece of non-text information may be obtained.

It should be noted that FIG. 3 is used to assist in describing the technical solutions provided in embodiments of this application. In actual application, for a first location P1 associated with any piece of non-text information X0, it may not be possible to simultaneously present X0 and a character T1 whose arrangement location is P1 in a graphical user interface displayed by the terminal device 101. Similarly, for a third location P2 associated with X0, it may not be possible to simultaneously present X0 and a character T2 whose arrangement location is P2 in a graphical user interface displayed by the terminal device 101.

Optionally, the terminal device 101 further performs step 206 of storing the current picture respectively corresponding to the at least one piece of non-text information; and for each piece of non-text information, associating a first location corresponding to the piece of non-text information with a current picture corresponding to the piece of non-text information and storing the first location, and associating a third location corresponding to the piece of non-text information with the current picture corresponding to the piece of non-text information and storing the third location.

A difference from step 206 is that if the terminal device 101 does not perform step 203, the terminal device 101 may store the at least one piece of non-text information; and for each piece of non-text information, the non-text information is associated with the first location associated with the non-text information and is stored, and the non-text information is associated with the third location associated with the non-text information and is stored.

Optionally, the terminal device 101 further performs step 207 of determining scenario configuration information of the terminal device 101, and determining a priority sequence of at least two third terminal devices based on the scenario configuration information.

The third terminal device and the terminal device 101 are located in a same distributed network 10. The scenario configuration information may be determined based on information from another terminal device or sensor, or may be input by the user with the terminal device 101.

In a possible implementation, the scenario configuration information may indicate a service scenario. For the indicated service scenario, a priority sequence of at least two third terminal devices is preconfigured in the terminal device 101 for the service scenario, or the terminal device can determine a priority sequence of at least two third terminal devices based on respective features of the at least two third terminal devices.

For example, the at least two third terminal devices include a terminal device 102, a terminal device 103, and a terminal device 104. The scenario configuration information indicates that the terminal device 102 is an in-vehicle terminal, the terminal device 103 is a smartwatch, and the terminal device 104 is smart glasses. Correspondingly, the service scenario in which the user drives a vehicle may be determined based on the scenario configuration information, and a priority sequence may be pre-configured or determined based on corresponding algorithm logic for the service scenario in which the user drives the vehicle: the terminal device 102, the terminal device 104, the terminal device 103.

In a possible implementation, the scenario configuration information may indicate the priority sequence of the at least two third terminal devices.

For example, the at least two third terminal devices include a terminal device 103 and a terminal device 104. The user may input the scenario configuration information into the terminal device through a corresponding graphical user interface. The scenario configuration information directly indicates that a priority sequence of the terminal device 103 and the terminal device 104 is: the terminal device 104, the terminal device 103.

Optionally, the terminal device 101 further performs step 208 of selecting the second terminal device from the at least two third terminal devices according to the priority sequence.

To clearly describe the technical solutions provided in embodiments of this application, in a subsequent process, an example in which the at least two third terminal devices include the terminal device 102, the terminal device 103, and the terminal device 104, and the priority sequence is the terminal device 102, the terminal device 104, the terminal device 103 is mainly used. It is clear that, in actual application, fewer or more third terminal devices may be included.

Then, the terminal device 101 performs step 209 of sending a capability query message to the terminal device 102.

Then, the terminal device 102 performs, in response to the capability query message from the terminal device 101, step 210 of determining whether the non-text information from the terminal device 101 can be displayed. In other words, it is determined whether the terminal device 102 can have enough display resources and/or permissions to display the non-text information from the terminal device 101 in a subsequent time period.

Then, the terminal device 102 performs step 211 of sending a capability response message to the terminal device 101. The capability response message indicates whether the terminal device 102 can be configured to display the non-text information from the terminal device 101.

If the terminal device 102 cannot be configured to display the non-text information from the terminal device 101, the terminal device 101 performs step 208 again. For example, the terminal device 104 located behind the terminal device 102 is selected as the second terminal device according to the priority sequence.

If the terminal device 102 can be configured to display the non-text information from the terminal device 101, the terminal device 101 further performs step 212 of sequentially performing TTS on the at least one piece of text information included in the target information, to obtain speech information respectively corresponding to the at least one piece of text information, and sequentially playing the speech information respectively corresponding to the at least one piece of text information.

Then, the terminal device 101 further performs step 213 of sending target non-text information or a current picture corresponding to the target non-text information to the terminal device 102 when speech information corresponding to first text information is played. An arrangement location of the first text information in the target information includes a second location. The second location is a first location associated with any piece of non-text information. The target non-text information is non-text information associated with the second location.

Specifically, an arrangement location of one piece of text information in the target information may be represented by respective arrangement locations of a plurality of characters included in the text information in the target information. For any piece of non-text information X0, a first location associated with the piece of non-text information X0 is P1, and a character T1 whose arrangement location is P1 is included in one piece of text information S1, or in other words, an arrangement location of one piece of text information S1 in the target information includes P1. In this case, when the terminal device 101 plays speech information corresponding to S1, if the terminal device 101 performs step 203 and step 206, the terminal device 101 may send a current picture (namely, a current picture corresponding to X0) associated with P1 to the terminal device 102. If the terminal device 101 does not perform step 203 and step 206, the terminal device 101 may send X0 associated with P1 to the terminal device 102.

To facilitate description of the technical solutions provided in embodiments of this application, the target non-text information is subsequently represented as X0.

Correspondingly, the terminal device 102 performs step 214 of displaying X0 or the current picture corresponding to X0 from the terminal device 101.

It should be noted that, before the terminal device 102 performs step 214, when a display of the terminal device 102 is not lit, the terminal device 102 may automatically light the display of the terminal device 102. Correspondingly, after the display of the terminal device is lit, a corresponding lock screen may be displayed. In step 214, the terminal device 102 may display, on the lock screen, X0 or the current picture corresponding to X0 from the terminal device 101.

It should be noted that, the terminal device 102 may further adjust, through a corresponding display interface, transparency of X0 or the current picture corresponding to X0 displayed on the terminal device 102, a location of X0 or the current picture corresponding to X0 on the display of the terminal device 102, and the like.

Optionally, the terminal device 101 further performs step 215 of playing first speech information after playing speech information corresponding to third text information. The first speech information indicates to display the target non-text information X0 on the terminal device 102, and an arrangement location of the third text information in the target information is in front of an arrangement location of the target non-text information X0 in the target information, and is adjacent to the arrangement location of the target non-text information X0 in the target information.

Specifically, for each piece of non-text information, that is, for target text information X0, in the target information, X0 may be replaced with text information indicating to display X0 on the terminal device 102, or a virtual label is set at an arrangement location P0 of X0, and the text information indicating to display X0 on the terminal device 102 is associated with the virtual label. After the terminal device 101 completes TTS on the third text information, TTS is performed on the text information associated with the virtual label, to obtain the first speech information.

The terminal device 101 further performs step 216 of sending indication information to the terminal device 102 when speech information corresponding to second text information is played. An arrangement location of the second text information in the target information includes a fourth location, the fourth location is a third location associated with the target non-text information X0, and the indication information indicates the second terminal device to stop displaying X0 or the current picture corresponding to X0.

Correspondingly, the terminal device 102 performs step 217 of stopping displaying X0 or the current picture corresponding to X0.

It should be noted that, after the terminal device 102 no longer displays the non-text information or the picture from the terminal device 101, the terminal device 102 may automatically turn off the display of the terminal device 102 according to a corresponding policy.

In some embodiments, a difference from the embodiment shown in FIG. 2A and FIG. 2B is that, when there is no second terminal device that can be configured to display non-text information, the terminal device 101 may display the non-text information. A policy of displaying the non-text information or the current picture corresponding to the non-text information on the terminal device 101 is the same as a policy of displaying the non-text information or the current picture corresponding to the terminal device 102, and details are not described herein again.

In some embodiments, a difference from the embodiment shown in FIG. 2A and FIG. 2B is that, when accumulated duration after the terminal device 101 sends the target non-text information to the second terminal device reaches predetermined duration, the terminal device 101 may send indication information to the terminal device 102, to indicate the terminal device 102 to stop displaying the target non-text information.

In some embodiments, a difference from the embodiment shown in FIG. 2A and FIG. 2B is that for any piece of non-text information whose type is a picture, a keyword associated with the non-text information may be further determined, to determine an arrangement location of the keyword in the target information as a first location associated with the non-text information. For example, for a picture whose sequence number is j in the target information, a piece of text information in the target information may include a keyword such as "as shown in FIG. j" or "refer to FIG. j" that prompts the user to view a corresponding picture. Correspondingly, it may be determined that an arrangement location of the keyword such as "as shown in FIG. j" or "refer to FIG. j" in the target information is a first location associated with the picture.

Figure 4:
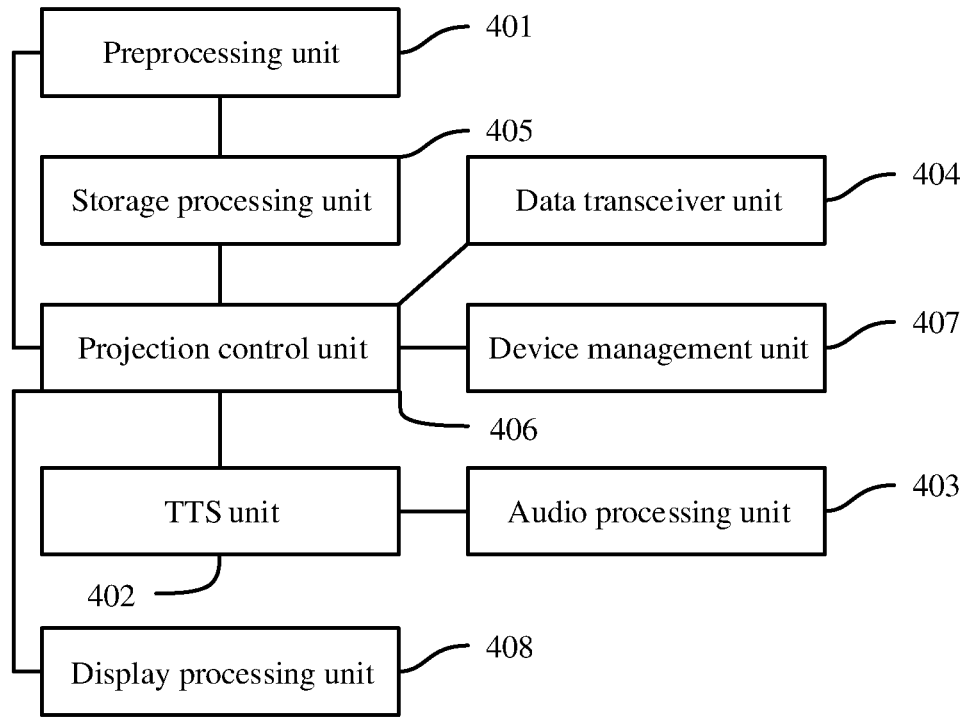
FIG. 4 is a schematic diagram 1 of an information processing apparatus according to an embodiment of this application.

Based on a same concept as the foregoing method embodiment, an embodiment of this application further provides an information processing apparatus 40, used in a first terminal device. The information processing apparatus 40 may be implemented by software, hardware, or a combination of software and hardware. More specifically, the information processing apparatus 40 may be a chip or a system-on-a-chip deployed in the first terminal device. As shown in FIG. 4, the information processing apparatus 40 may include at least:

a preprocessing unit 401, configured to: determine target information, where the target information includes at least one piece of text information and at least one piece of non-text information; and determine, based on a preset playing speed and a first preset time, a first location respectively associated with the at least one piece of non-text information;

a TTS unit 402, configured to sequentially perform TTS on the at least one piece of text information, to obtain speech information respectively corresponding to the at least one piece of text information;

an audio processing unit 403, configured to sequentially play the speech information respectively corresponding to the at least one piece of text information; and a data transceiver unit 404, configured to: if a second terminal device configured to display the at least one piece of non-text information exists, when speech information corresponding to first text information is played, send target non-text information to the second terminal device, where the at least one piece of text information includes the first text information, an arrangement location of the first text information in the target information includes a second location, the second location is a first location associated with any piece of non-text information, and the target non-text information is non-text information associated with the second location.

Optionally, the information processing apparatus 40 may further include one or more of a storage processing unit 405, a projection control unit 406, a device management unit 407, and a display processing unit 408.

Figure 5:
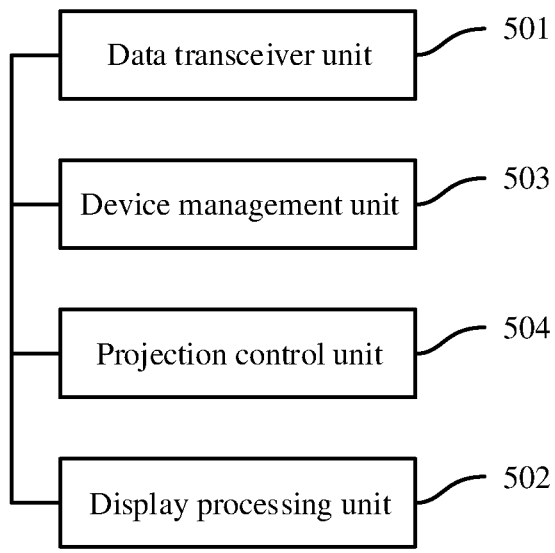
FIG. 5 is a schematic diagram 2 of an information processing apparatus according to an embodiment of this application.

Based on a same concept as the foregoing method embodiment, an embodiment of this application further provides an information processing apparatus 50, used in a second terminal device. The information processing apparatus 50 may be implemented by software, hardware, or a combination of software and hardware. More specifically, the information processing apparatus 50 may be a chip or a system-on-a-chip deployed in the second terminal device. As shown in FIG. 5, the information processing apparatus 50 may include:

a data transceiver unit 501, configured to receive target non-text information from a first terminal device; and a display processing unit 502, configured to display the target non-text information on the first terminal device.

Optionally, the information processing apparatus 50 further includes one or more of a device management unit 503 and a projection control unit 504.

Figure 6A:
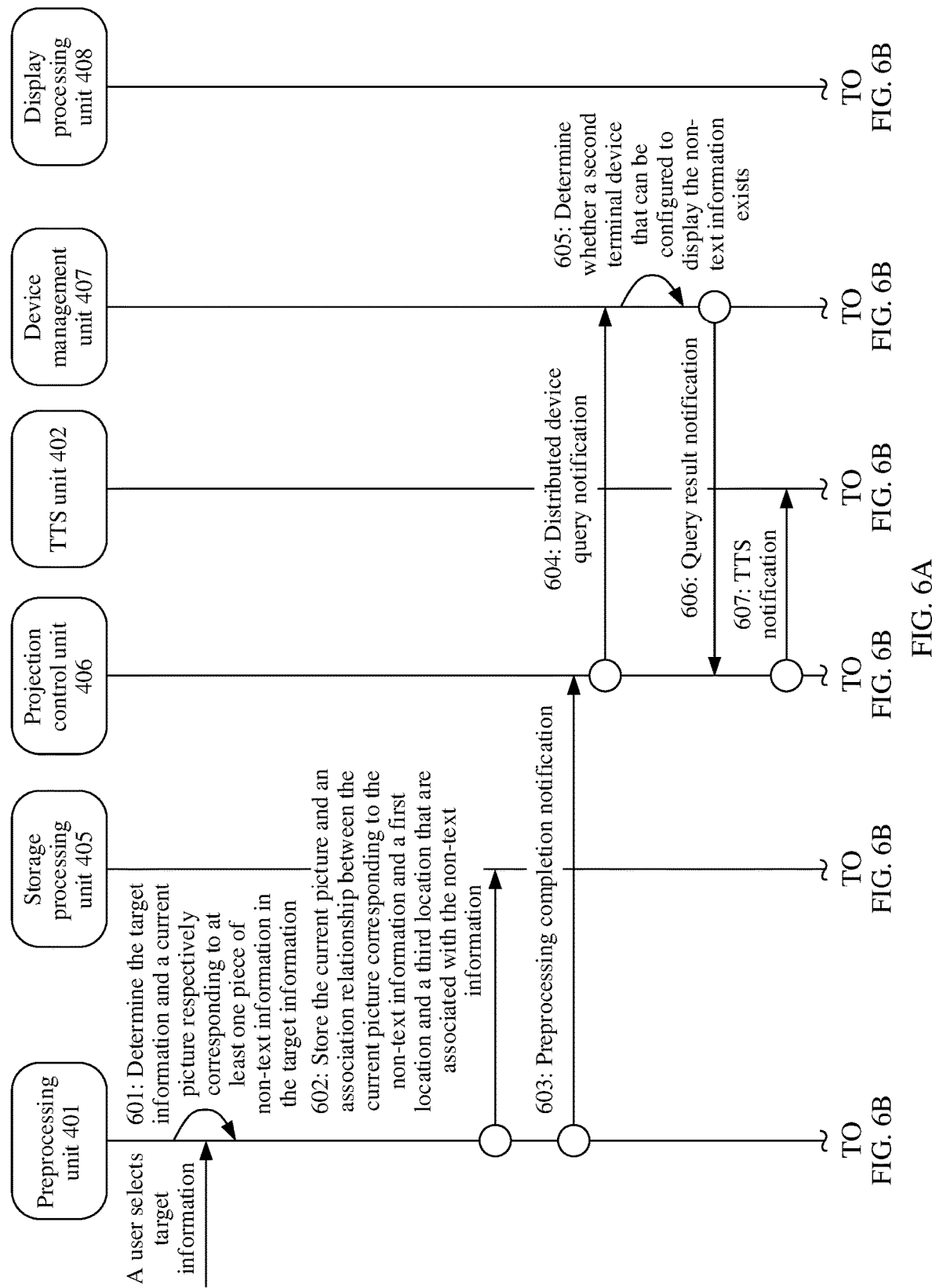
FIG. 6A to FIG. 6C are a schematic diagram of a process in which an information processing apparatus used in a first terminal device processes target information.
Figure 6B:
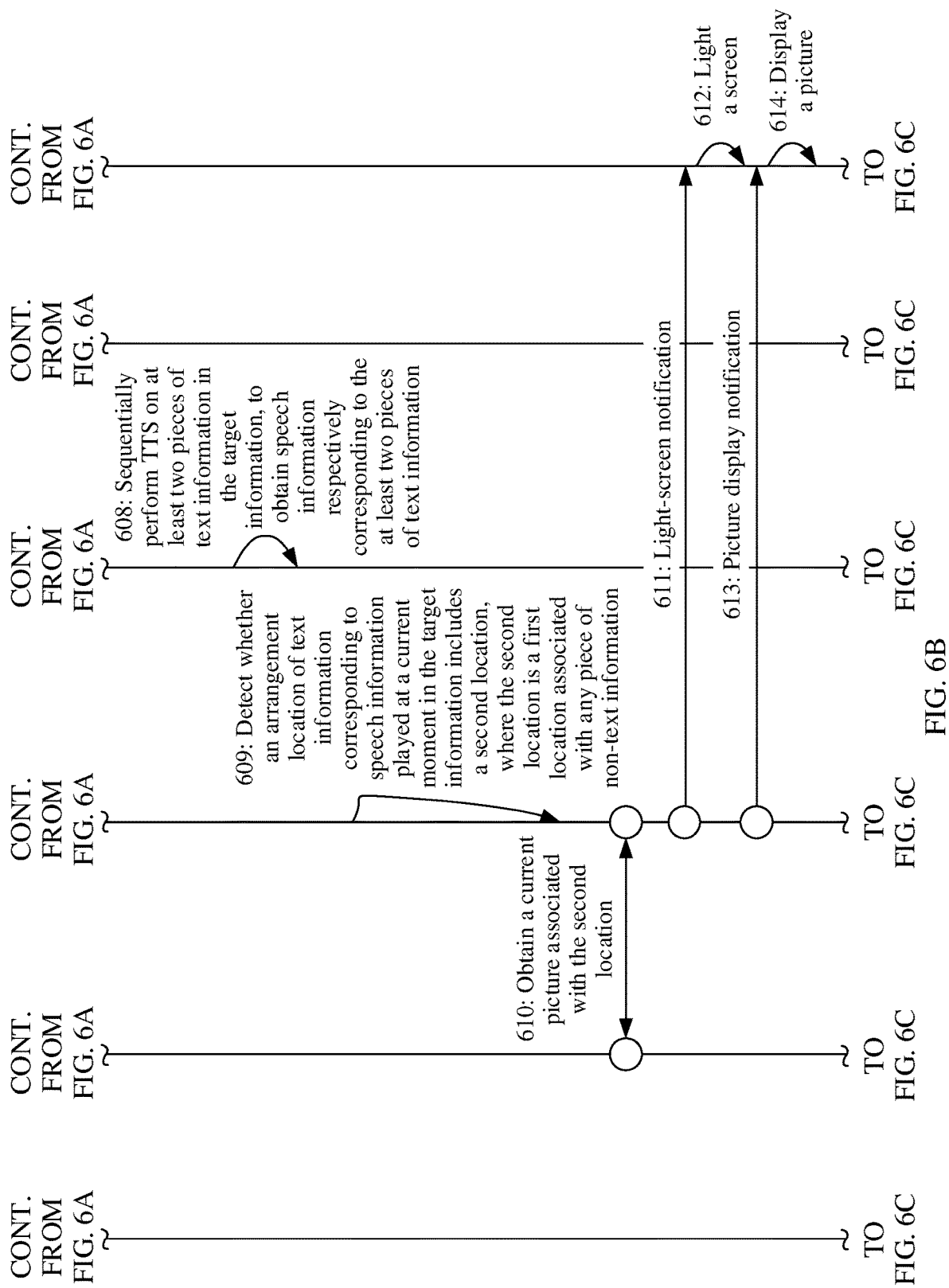
Figure 6C:
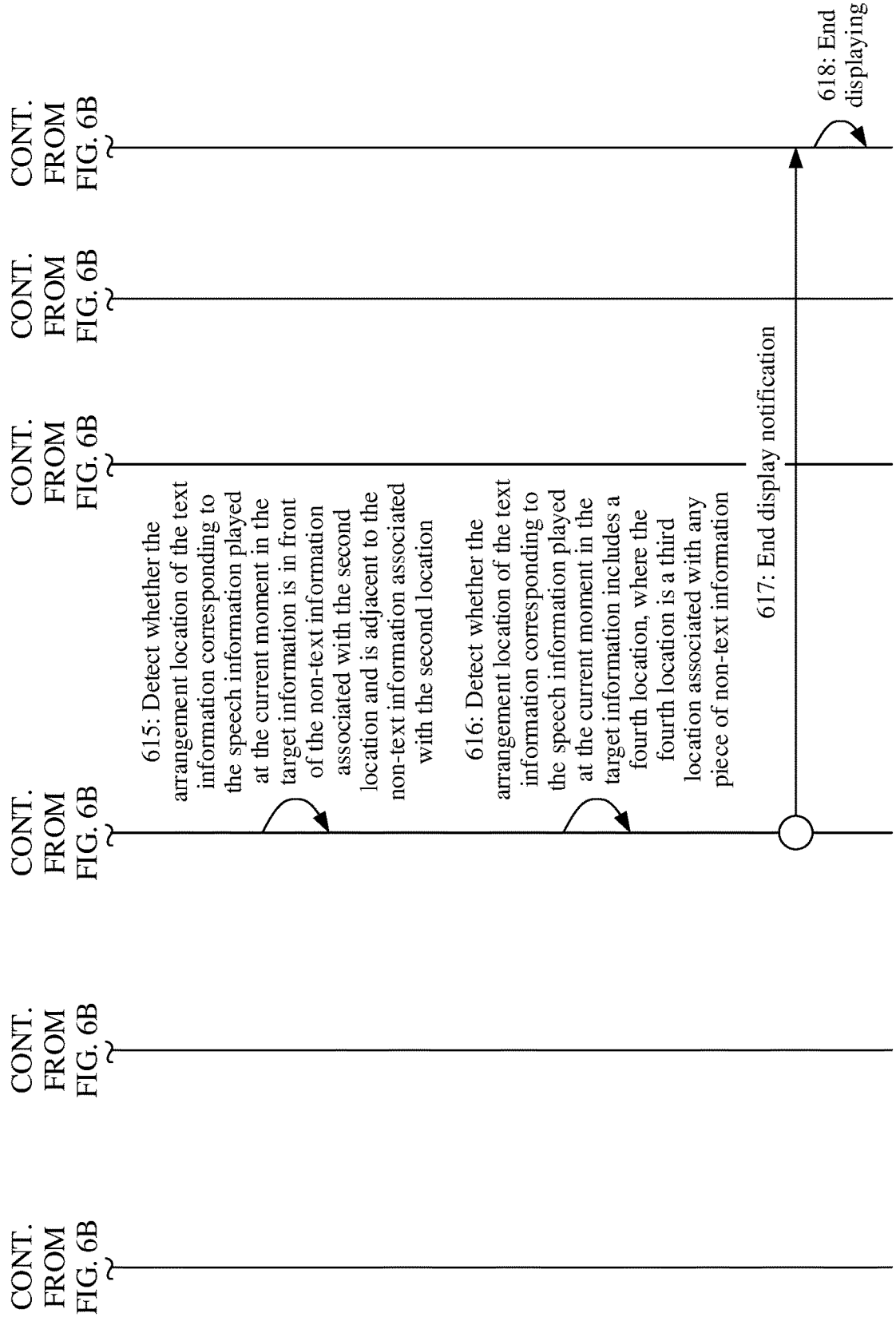
Figure 7B:
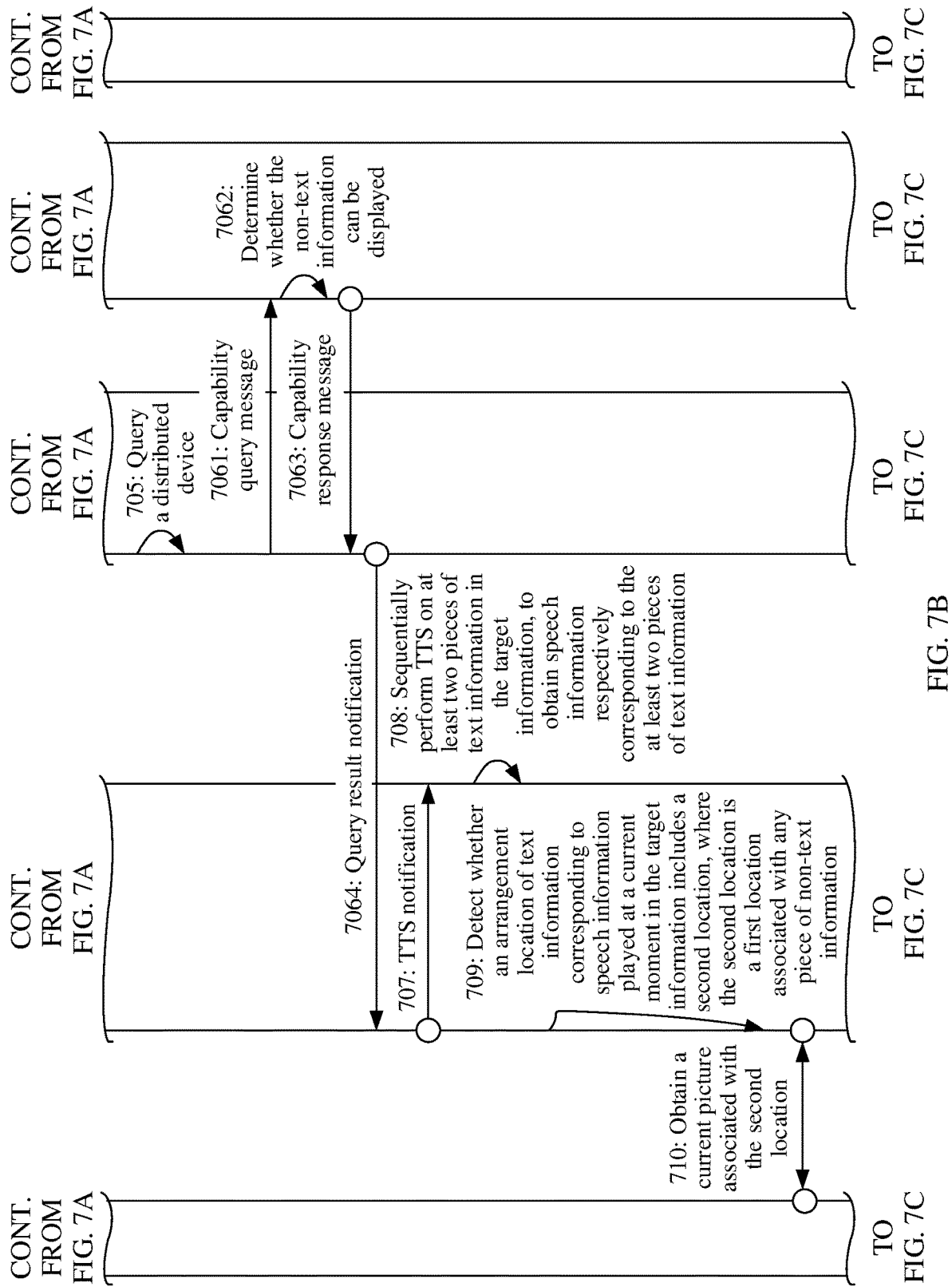
Figure 7D:
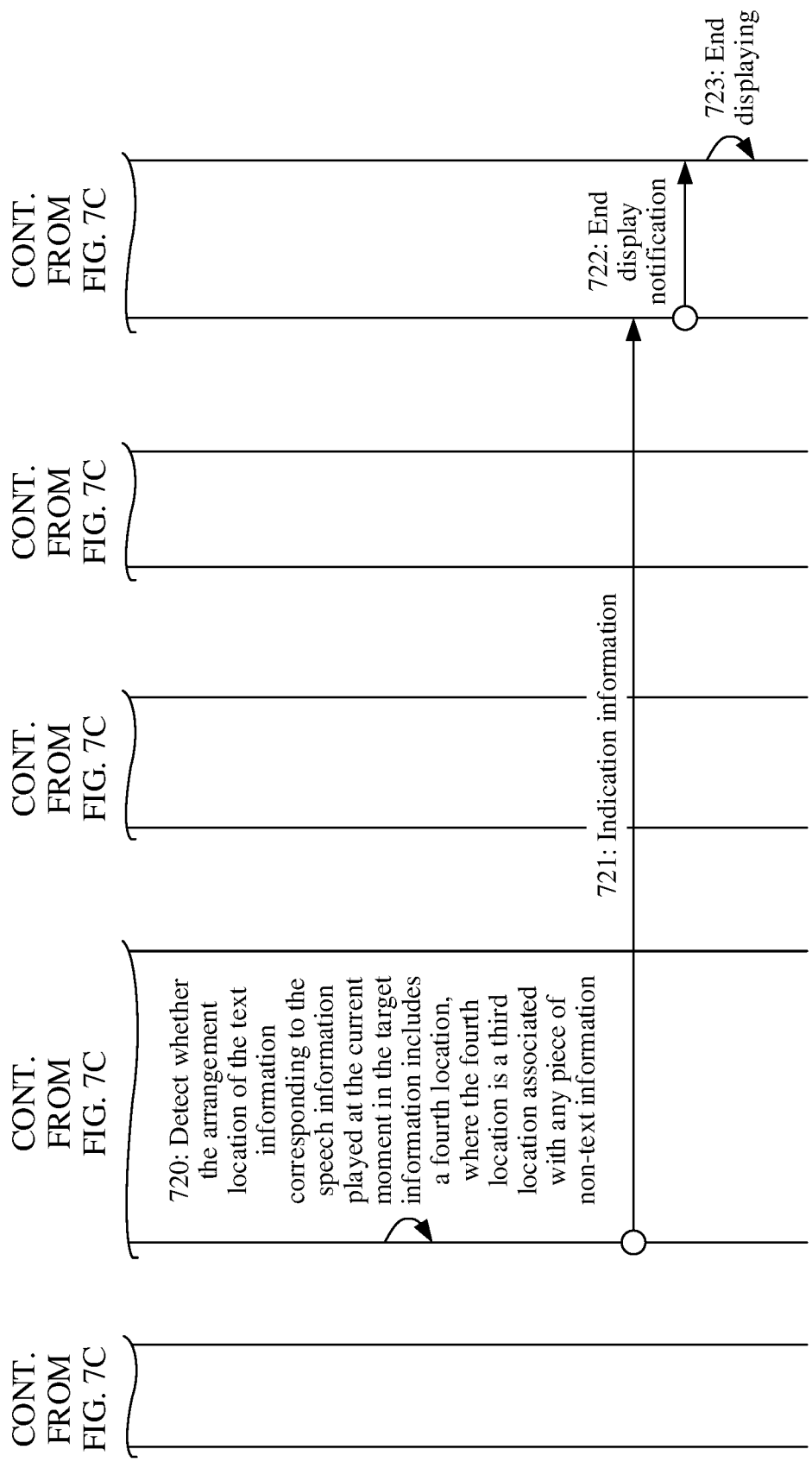

Refer to FIG. 6A to FIG. 6C. The following describes an example of a process in which the first terminal device independently processes target information. The first terminal device includes the information processing apparatus 40.

First, in step 601, the preprocessing unit 401 determines, based on a selection operation performed by a user on target information, the target information, and determines a current picture respectively corresponding to at least one piece of non-text information in the target information.

Then, in step 602, the preprocessing unit 401 determines, based on a preset playing speed and a first preset time, a first location respectively associated with the at least one piece of non-text information; and determines, based on the preset playing speed, a second preset time, and a respective arrangement location of the at least one piece of non-text information in the target information, a third location respectively associated with the at least one piece of non-text information. In addition, the storage processing unit 405 is triggered to store the current picture respectively corresponding to the at least one piece of non-text information, and store an association relationship between the current picture respectively corresponding to the at least one piece of non-text information and the first location and the third location that are associated with the at least one piece of non-text information.

Then, in step 603, the preprocessing unit 401 sends a preprocessing completion notification to the projection control unit 406.

Next, in step 604, the projection control unit 406 sends a distributed device query notification to the device management unit 407.

Then, in step 605, the device management unit 407 determines whether a second terminal device that can be configured to display non-text information exists. With reference to the foregoing example information exchange process between the terminal device 101 and the terminal device 102, the device management unit may determine, by performing information exchange with one or more third terminal devices, whether a second terminal device that can be configured to display non-text information exists; or if no third terminal device connected to the terminal device 101 exists, directly determine that no second terminal device that can be configured to display non-text information exists.

Then, in step 606, the device management unit 407 sends a query result notification to the projection control unit. The query result notification indicates that the second terminal device that can be configured to display non-text information does not exist.

Then, in step 607, the projection control unit 406 sends a TTS notification to the TTS unit 402.

Then, in step 608, in response to the TTS notification, the TTS unit 402 sequentially performs TTS on the at least one piece of text information in the target information, to obtain the speech information respectively corresponding to the at least one piece of text information. In addition, the audio processing unit 403 may sequentially play the speech information respectively corresponding to the at least one piece of text information.

Then, in step 609, the projection control unit 406 detects whether an arrangement location of text information corresponding to speech information played at a current moment in the target information includes a second location, where the second location is a first location associated with any piece of non-text information. If the arrangement location of the text information corresponding to the speech information played at the current moment in the target information includes the second location, the text information corresponding to the speech information played at the current moment is the first text information in the claims of this application, and the non-text information associated with the second location is the target non-text information in the claims of this application.

Then, in step 610, the projection control unit 406 obtains a current picture that is stored in the storage processing unit 405 and that is associated with the second location.

Then, in step 611, if a display of the first terminal device is not lit, the projection control unit 406 sends a light-screen notification to the display processing unit 408.

Then, in step 612, the display processing unit 408 lights the display of the first terminal device in response to the light-screen notification.

Then, in step 613, the projection control unit 406 sends a picture display notification to the display processing unit 408.

Then, in step 614, the display processing unit 408 displays the current picture associated with the second location.

Then, in step 615, the projection control unit 406 detects whether the arrangement location of the text information corresponding to the speech information played at the current moment in the target information is in front of the non-text information associated with the second location and is adjacent to the non-text information associated with the second location. If the arrangement location of the text information corresponding to the speech information played at the current moment in the target information is in front of the non-text information associated with the second location and is adjacent to the non-text information associated with the second location, the text information corresponding to the speech information played at the current moment is the second text information in the claims of this application, and the projection control unit 406 triggers the audio processing unit 403 to play first speech information.

Then, in step 616, the projection control unit 406 detects whether the arrangement location of the text information corresponding to the speech information played at the current moment in the target information includes a fourth location, where the fourth location is a third location associated with any piece of non-text information. If the arrangement location of the text information corresponding to the speech information played at the current moment in the target information includes the fourth location, the text information corresponding to the speech information played at the current moment is the third text information in the claims of this application, and the non-text information associated with the fourth location is the target non-text information in the claims of this application.

Then, in step 617, the projection control unit 406 sends an end display notification to the display processing unit 408.

Then, in step 618, the display processing unit 408 stops displaying the current picture associated with the fourth location in response to the end display notification.

Refer to FIG. 7A to FIG. 7D. The following describes an example of a process in which the functional units included in the information processing apparatus 40 and the functional units included in the information processing apparatus 50 cooperate with each other to process the target information.

First, in step 701, the preprocessing unit 401 determines, based on a selection operation performed by a user on target information, the target information, and determines a current picture respectively corresponding to at least one piece of non-text information in the target information.

Then, in step 702, the preprocessing unit 401 determines, based on a preset playing speed and a first preset time, a first location respectively associated with the at least one piece of non-text information; and determines, based on the preset playing speed, a second preset time, and a respective arrangement location of the at least one piece of non-text information in the target information, a third location respectively associated with the at least one piece of non-text information. In addition, the storage processing unit 405 is triggered to store the current picture respectively corresponding to the at least one piece of non-text information, and store an association relationship between the current picture respectively corresponding to the at least one piece of non-text information and the first location and the third location that are associated with the at least one piece of non-text information.

Then, in step 703, the preprocessing unit 401 sends a preprocessing completion notification to the projection control unit 406.

Next, in step 704, the projection control unit 406 sends a distributed device query notification to the device management unit 407.

Next, in step 705, the device management unit 407 queries a distributed device. Specifically, the device management unit may find a plurality of third terminal devices that belong to the same distributed network as the first terminal device, and select, from the plurality of third terminal devices according to a priority sequence of the plurality of third terminal devices, a second terminal device including the information processing apparatus 50.

Then, in step 7061, the device management unit 407 sends a capability query message to the device management unit 503.

Then, in step 7062, in response to the capability query message from the device management unit 407, the device management unit 503 determines whether the second terminal device including the information processing apparatus 50 can be configured to display non-text information.

Then, in step 7063, the device management unit 503 sends a capability response message to the device management unit 407.

Then, in step 7064, the device management unit 407 sends a query result notification to the projection control unit 406. The query result notification indicates related information of the second terminal device that can be configured to display non-text information, for example, a device identifier of the second terminal device that can be configured to display non-text information.

Then, in step 707, the projection control unit 406 sends a TTS notification to the TTS unit 402.

Then, in step 708, in response to the TTS notification, the TTS unit 402 sequentially performs TTS on the at least one piece of text information in the target information, to obtain the speech information respectively corresponding to the at least one piece of text information. In addition, the audio processing unit 403 may sequentially play the speech information respectively corresponding to the at least one piece of text information.

Then, in step 709, the projection control unit 406 detects whether an arrangement location of text information corresponding to speech information played at a current moment in the target information includes a second location, where the second location is a first location associated with any piece of non-text information. If the arrangement location of the text information corresponding to the speech information played at the current moment in the target information includes the second location, the text information corresponding to the speech information played at the current moment is the first text information in the claims of this application, and the non-text information associated with the second location is the target non-text information in the claims of this application.

Then, in step 710, the projection control unit 406 obtains the current picture that is stored in the storage processing unit 405 and that is associated with the second location.

Then, in step 711, the projection control unit 406 sends a picture sending notification to the data transceiver unit 404.

Then, in step 712, the data transceiver unit 404 sends, to the data transceiver unit 501, the current picture that is obtained by the projection control unit 406 and that is associated with the second location.

Then, in step 713, the projection control unit 406 sends a picture display notification to the projection control unit 504.

Then, in step 714, if a display of the second terminal device is not lit, the projection control unit 504 sends a light-screen notification to the display processing unit 502.

Then, in step 715, the display processing unit 502 lights the display of the second terminal device in response to the light-screen notification.

Then, in step 716, the projection control unit 504 obtains, from the data transceiver unit 501, the current picture associated with the second location.

Then, in step 716, the projection control unit 504 sends a picture display notification to the display processing unit 502.

Then, in step 718, the display processing unit 502 displays the current picture associated with the second location.

Then, in step 719, the projection control unit 406 detects whether the arrangement location of the text information corresponding to the speech information played at the current moment in the target information is in front of the non-text information associated with the second location and is adjacent to the non-text information associated with the second location. If the arrangement location of the text information corresponding to the speech information played at the current moment in the target information is in front of the non-text information associated with the second location and is adjacent to the non-text information associated with the second location, the text information corresponding to the speech information played at the current moment is the second text information in the claims of this application, and the projection control unit 406 triggers the audio processing unit 403 to play first speech information.

Then, in step 720, the projection control unit 406 detects whether the arrangement location of the text information corresponding to the speech information played at the current moment in the target information includes a fourth location, where the fourth location is a third location associated with any piece of non-text information. If the arrangement location of the text information corresponding to the speech information played at the current moment in the target information includes the fourth location, the text information corresponding to the speech information played at the current moment is the third text information in the claims of this application, and the non-text information associated with the fourth location is the target non-text information in the claims of this application.

Then, in step 721, the projection control unit 406 sends indication information to the projection control unit 504.

Then, in step 722, the projection control unit 504 sends an end display notification to the display processing unit 502 in response to the indication information.

Then, in step 723, the display processing unit 502 stops displaying the current picture associated with the fourth location.

It should be noted that information exchanged between the information processing apparatus 40 and the information processing apparatus 50 may be received and/or sent through the data transceiver unit 404 and the data transceiver unit 501. For example, for the capability query message sent by the device management unit 407 to the device management unit 503, the device management unit 407 may generate the capability query message, and then the data transceiver unit sends the capability query message generated by the device management unit 407 to the data transceiver unit 501, so that the data transceiver unit 501 provides the received capability query message to the device management unit 503.

Figure 8:
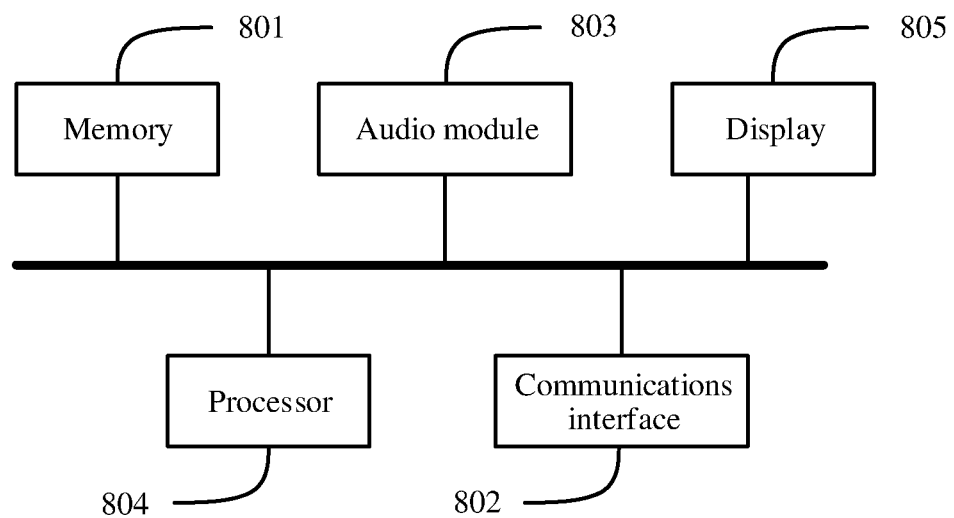
FIG. 8 is a schematic diagram of a structure of a first terminal device according to an embodiment of this application.

Based on a same concept as the foregoing embodiments, an embodiment of this application further provides a first terminal device, configured to implement the method steps performed by the terminal device 101 or the information processing apparatus 40 in the foregoing embodiments. More specifically, in terms of a hardware structure, as shown in FIG. 8, the first terminal device 80 may include a memory 801, a communications interface 802, an audio module 803, and a processor 804.

The memory 801 is configured to store computer instructions.

The processor 804 is configured to execute the computer instructions to implement: determining target information, where the target information includes at least one piece of text information and at least one piece of non-text information; determining, based on a preset playing speed and a first preset time, a first location respectively associated with the at least one piece of non-text information; sequentially performing text-to-speech TTS on the at least one piece of text information, to obtain speech information respectively corresponding to the at least one piece of text information, and sequentially playing the speech information respectively corresponding to the at least one piece of text information with the audio module 803; and if a second terminal device configured to display the at least one piece of non-text information exists, when speech information corresponding to first text information is played with the audio module 803, sending target non-text information to the second terminal device through the communications interface 802, where the at least one piece of text information includes the first text information, an arrangement location of the first text information in the target information includes a second location, the second location is a first location associated with any piece of non-text information, and the target non-text information is non-text information associated with the second location.

In a possible implementation, the processor 804 is further configured to implement: determining, based on the preset playing speed and a second preset time, a third location respectively associated with the at least one piece of non-text information; and sending indication information to the second terminal device through the communications interface when speech information corresponding to second text information is played with the audio module 803, where the at least one piece of text information includes the second text information, an arrangement location of the second text information in the target information includes a third location, the third location is a first location associated with the target non-text information, and the indication information indicates the second terminal device to stop displaying the target non-text information.

In a possible implementation, the processor 804 is further configured to implement: playing first speech information with the audio module 803 after speech information corresponding to third text information is played with the audio module 803, where the first speech information indicates that the target non-text information is displayed on the second terminal device, an arrangement location of the third text information in the target information is in front of an arrangement location of the target non-text information in the target information, and is adjacent to the arrangement location of the target non-text information in the target information, and the at least one piece of text information includes the third text information.

In a possible implementation, the processor 804 is further configured to implement: sending a capability query message to the second terminal device through the communications interface 802; and receiving a capability response message from the second device through the communications interface 802, where the capability response message indicates whether the second terminal device can be configured to display the at least one piece of non-text information.

In a possible implementation, the processor 804 is further configured to implement: determining scenario configuration information of the first terminal device; determining a priority sequence of at least two third terminal devices based on the scenario configuration information, where the at least two third terminal devices and the first terminal device 80 are located in a same distributed network; and selecting the second terminal device from the at least two third terminal devices according to the priority sequence.

In a possible implementation, the first terminal device 80 further includes a display 805. The processor 804 is further configured to implement: if no second terminal device configured to display the at least one piece of non-text information exists, when the speech information corresponding to the first text information is played with the audio module 803, displaying the target non-text information on the display 805.

In a possible implementation, the processor 804 is further configured to implement: lighting the display 805, where the target non-text information is displayed on a lock screen of the display 805.

In a possible implementation, the processor 804 is further configured to implement: determining a current picture respectively corresponding to the at least one piece of non-text information. The processor 804 may be specifically configured to implement: sending a current picture corresponding to the target non-text information to the second terminal device through the communications interface 802.

Figure 9:
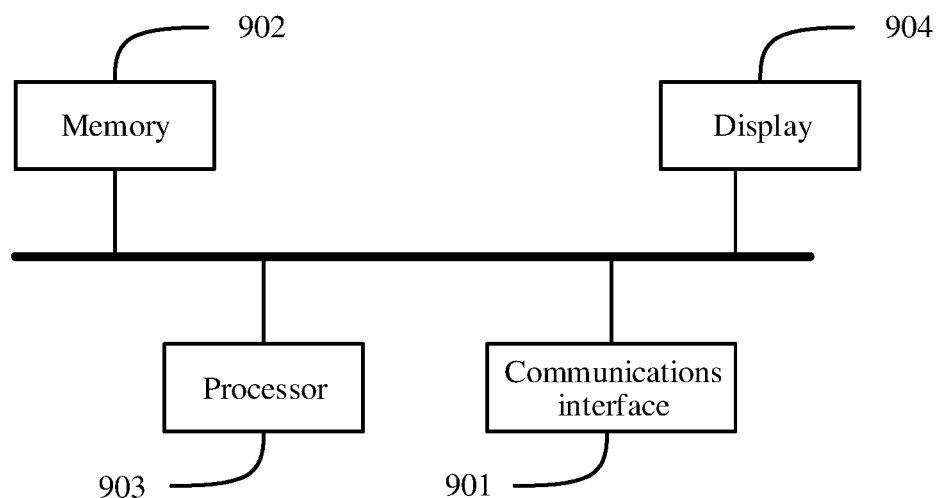
FIG. 9 is a schematic diagram of a structure of a second terminal device according to an embodiment of this application.

Based on a same concept as the foregoing embodiments, an embodiment of this application further provides a second terminal device, configured to implement the method steps performed by the terminal device 102 or the information processing apparatus 50 in the foregoing embodiments. More specifically, in terms of a hardware structure, as shown in FIG. 9, the second terminal device 90 may include a communications interface 901, a memory 902, a processor 903, and a display 904.

The memory 902 is configured to store computer instructions.

The processor 903 is configured to execute the computer instructions, to implement: receiving target non-text information from a first terminal device through the communications interface 901; and displaying the target non-text information on the display 904.

In a possible implementation, the processor 903 is further configured to implement: receiving indication information from the first terminal device through the communications interface 901; and stopping displaying of the target non-text information based on an indication of the indication information.

In a possible implementation, the processor 903 is further configured to implement: receiving a capability query message from the first terminal device through the communications interface 901; in response to the capability query message, querying whether the second terminal device 90 can be configured to display non-text information; and sending a capability response message to the first terminal device through the communications interface 901, where the capability response message indicates whether the second terminal device 90 can be configured to display non-text information.

An embodiment of this application further provides a computer-readable storage medium, configured to store computer instructions. When the computer instructions are executed by a processor of a terminal device, the terminal device is enabled to implement the method performed by the terminal device 101, the first terminal device 80, or the information processing apparatus 40 in the foregoing embodiments, or implement the method performed by the terminal device 102, the second terminal device 90, or the information processing apparatus 50 in the foregoing embodiments.

An embodiment of this application further provides a computer program product. The computer program product includes computer program code/instructions. When the computer program code/instructions runs/run on a computer, the computer is enabled to perform the method performed by the terminal device 101, the first terminal device 80, or the information processing apparatus 40 in the foregoing embodiments, or perform the method performed by the terminal device 102, the second terminal device 90, or the information processing apparatus 50 in the foregoing embodiments.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

It may be clearly understood by a person skilled in the art that, for the purpose of convenient and brief description, for a detailed working process of the foregoing network device, refer to a corresponding process in the foregoing method embodiments. Details are not described herein again.

It may be understood that the described apparatus embodiments are examples. For example, the module/unit division is merely logical function division, and may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Finally, it should be noted that the foregoing embodiments are merely intended for describing the technical solutions of this application, but not for limiting this application. Although this application is described in detail with reference to the foregoing embodiments, a person of ordinary skill in the art should understand that they may still make modifications to the technical solutions provided in the foregoing embodiments or make equivalent replacements to some technical features thereof, without departing from the scope of the technical solutions of embodiments of this application.

The invention claimed is:

1. An information processing method, applied to a first terminal device, comprising:
    determining target information, wherein the target information comprises at least one piece of text information and at least one piece of non-text information;
    determining, based on a predetermined playing speed and a first predetermined time, at least one first location associated with the at least one piece of non-text information;

sequentially performing text-to-speech (TTS) on the at least one piece of text information, to obtain speech information corresponding to the at least one piece of text information;

sequentially playing the speech information corresponding to the at least one piece of text information;

in response to determining a second terminal device is configured to display the at least one piece of non-text information and speech information corresponding to first text information is played, sending target non-text information to the second terminal device, wherein the at least one piece of text information comprises the first text information, an arrangement location of the first text information in the target information comprises a second location, the second location is comprised in the at least one first location, and the target non-text information is non-text information associated with the second location; and in response to determining that no second terminal device configured to display the at least one piece of non-text information exists and the speech information corresponding to the first text information is played, displaying the target non-text information on a lock screen of a display of the first device.

2. The method according to claim 1, further comprising:
determining, based on the predetermined playing speed, a second predetermined time, and an arrangement location of the at least one piece of non-text information in the target information, at least one third location associated with the at least one piece of non-text information; and sending indication information to the second terminal device when speech information corresponding to second text information is played, wherein the at least one piece of text information comprises the second text information, an arrangement location of the second text information in the target information comprises a fourth location, the fourth location is comprised in the at least one third location, and the indication information indicates the second terminal device to stop displaying the target non-text information.

3. The method according to claim 1, further comprising:
in response to determining that accumulated duration after the target non-text information is sent to the second terminal device reaches predetermined duration, sending indication information to the second terminal device, wherein the indication information indicates the second terminal device to stop displaying the target non-text information.

4. The method according to claim 1, further comprising:
playing first speech information after speech information corresponding to third text information is played, wherein the first speech information indicates that the target non-text information is displayed on the second terminal device, an arrangement location of the third text information in the target information is in front of an arrangement location of the target non-text information in the target information and is adjacent to the arrangement location of the target non-text information in the target information, and the at least one piece of text information comprises the third text information.

5. The method according to claim 1, further comprising:
sending a capability query message to the second terminal device; and receiving a capability response message from the second terminal device, wherein the capability response message indicates whether the second terminal device is capable of being configured to display the at least one piece of non-text information.

6. The method according to claim 5, wherein
before the sending a capability query message to the second terminal device, the method further comprises:
determining scenario configuration information of the first terminal device;

determining a priority sequence of at least two third terminal devices based on the scenario configuration information, wherein the at least two third terminal devices and the first terminal device are located in a same distributed network; and selecting the second terminal device from the at least two third terminal devices according to the priority sequence.

7. The method according to claim 1, wherein
before the displaying the target non-text information, the method further comprises: turning on the display of the first terminal device.

8. The method according to claim 1, wherein the piece of non-text information is of one of the following types: a picture, a chart, a formula, computer program code, or a special symbol.

9. A first terminal device, comprising:
at least one processor, a communications interface, an audio processor, and a memory storing program instructions for execution by the at least one processor to cause the first terminal device to perform operations comprising:
determining target information, wherein the target information comprises at least one piece of text information and at least one piece of non-text information;

determining, based on a predetermined playing speed and a first predetermined time, at least one first location associated with the at least one piece of non-text information;

sequentially performing text-to-speech (TTS) on the at least one piece of text information, to obtain speech information corresponding to the at least one piece of text information;

sequentially playing the speech information corresponding to the at least one piece of text information with the audio processor;

in response to determining a second terminal device is configured to display the at least one piece of non-text information exists, when speech information corresponding to first text information is played with the audio processor, sending target non-text information to the second terminal device through the communications interface, wherein the at least one piece of text information comprises the first text information, an arrangement location of the first text information in the target information comprises a second location, the second location is comprised in the at least one first location, and the target non-text information is non-text information associated with the second location; and in response to determining that no second terminal device configured to display the at least one piece of non-text information exists and the speech information corresponding to the first text information is played, displaying the target non-text information on a lock screen of a display of the first device.

10. The first terminal device according to claim 9, wherein the operations further comprise:

determining, based on the predetermined playing speed and a second predetermined time, at least one third location associated with the at least one piece of non-text information; and sending indication information to the second terminal device through the communications interface when speech information corresponding to second text information is played with the audio processor, wherein the at least one piece of text information comprises the second text information, an arrangement location of the second text information in the target information comprises a fourth location, the fourth location is comprised in the at least one third location, and the indication information indicates the second terminal device to stop displaying the target non-text information.

11. The first terminal device according to claim 9, wherein the operations further comprise:
in response to determining that accumulated duration after the target non-text information is sent to the second terminal device reaches predetermined duration, sending indication information to the second terminal device, wherein the indication information indicates the second terminal device to stop displaying the target non-text information.

12. The first terminal device according to claim 9, wherein the operations further comprise:
playing first speech information with the audio processor after speech information corresponding to third text information is played with the audio processor, wherein the first speech information indicates that the target non-text information is displayed on the second terminal device, an arrangement location of the third text information in the target information is in front of an arrangement location of the target non-text information in the target information and is adjacent to the arrangement location of the target non-text information in the target information, and the at least one piece of text information comprises the third text information.

13. The first terminal device according to claim 9, wherein the operations further comprise:
sending a capability query message to the second terminal device through the communications interface; and
receiving a capability response message from the second device through the communications interface, wherein the capability response message indicates whether the second terminal device is capable of being configured to display the at least one piece of non-text information.

14. The first terminal device according to claim 13, wherein the operations further comprise:
determining scenario configuration information of the first terminal device;
determining a priority sequence of at least two third terminal devices based on the scenario configuration information, wherein the at least two third terminal devices and the first terminal device are located in a same distributed network; and
selecting the second terminal device from the at least two third terminal devices according to the priority sequence.

15. The first terminal device according to claim 9, wherein the operations further comprise:
turning on the display.

16. The first terminal device according to claim 9, wherein the piece of non-text information is of one of the following types: a picture, a chart, a formula, computer program code, and a special symbol.

17. A non-transitory, computer-readable medium storing one or more instructions executable by at least one processor to perform operations comprising:
determining target information, wherein the target information comprises at least one piece of text information and at least one piece of non-text information;
determining, based on a predetermined playing speed and a first predetermined time, at least one first location associated with the at least one piece of non-text information;
sequentially performing text-to-speech (TTS) on the at least one piece of text information, to obtain speech information corresponding to the at least one piece of text information;
sequentially playing the speech information respectively corresponding to the at least one piece of text information with an audio processor;
in response to determining a second terminal device is configured to display the at least one piece of non-text information and speech information corresponding to first text information is played with the audio processor, sending target non-text information to the second terminal device through the communications interface, wherein the at least one piece of text information comprises the first text information, an arrangement location of the first text information in the target information comprises a second location, the second location is comprised in the at least one first location, and the target non-text information is non-text information associated with the second location; and
in response to determining that no second terminal device configured to display the at least one piece of non-text information exists and the speech information corresponding to the first text information is played, displaying the target non-text information on a lock screen of a display of the first device.

18. The non-transitory computer-readable storage medium according to claim 17, wherein the operations further comprise:
determining, based on the predetermined playing speed and a second predetermined time, at least one third location associated with the at least one piece of non-text information; and
sending indication information to the second terminal device through the communications interface when speech information corresponding to second text information is played with the audio processor, wherein the at least one piece of text information comprises the second text information, an arrangement location of the second text information in the target information comprises a fourth location, the fourth location comprised in the at least one third location, and the indication information indicates the second terminal device to stop displaying the target non-text information.

* * * * *